US012083873B2

(12) United States Patent
Clark

(10) Patent No.: US 12,083,873 B2
(45) Date of Patent: Sep. 10, 2024

(54) VEHICLE HYBRID SAFETY HATCH

(71) Applicant: Specialty Manufacturing, Inc., Belton, MO (US)

(72) Inventor: Walker Coriell Clark, Charlotte, NC (US)

(73) Assignee: Specialty Manufacturing, Inc., Belton, MO (US)

( * ) Notice: Subject to any disclaimer, the term of this patent is extended or adjusted under 35 U.S.C. 154(b) by 93 days.

(21) Appl. No.: 17/167,257

(22) Filed: Feb. 4, 2021

(65) Prior Publication Data

US 2021/0245594 A1 Aug. 12, 2021

Related U.S. Application Data

(60) Provisional application No. 62/970,771, filed on Feb. 6, 2020.

(51) Int. Cl.
*B60J 7/16* (2006.01)
*B60J 10/82* (2016.01)
*B60R 25/10* (2013.01)
*B60R 25/34* (2013.01)

(52) U.S. Cl.
CPC ............ *B60J 10/82* (2016.02); *B60J 7/1642* (2013.01); *B60R 25/1006* (2013.01); *B60R 25/34* (2013.01)

(58) Field of Classification Search
CPC ... B60J 10/82; B60J 7/165; B60J 7/185; B60J 7/1628; B60J 7/1635; B60J 7/1642; B60J 7/11; B60J 10/90; B60R 25/34; B60R 25/1006; B60H 1/245; B60P 3/32; E05F 11/10; E05F 11/12; E05F 11/145; B61D 17/16; B63B 19/14; B63B 19/24; B63B 19/26

USPC ..... 296/96.11, 212, 216.02, 219, 168, 180.4, 296/156, 93, 216.01, 216.06, 216.07; 49/141, 394, 402; 454/136, 275; 292/93; 105/377.07, 377.11; 114/201 R, 203
See application file for complete search history.

(56) References Cited

U.S. PATENT DOCUMENTS 2,970,347 A * 2/1961 Massopust ........... B61D 19/009
105/377.07
4,115,955 A * 9/1978 Aldrich ..................... E05D 1/06
49/261

(Continued)

FOREIGN PATENT DOCUMENTS

CA 2708446 A1 5/2003
CA 2411528 C 9/2010

(Continued)

*Primary Examiner* — Amy R Weisberg
*Assistant Examiner* — Wenwei Zhuo
(74) *Attorney, Agent, or Firm* — Nelson Mullins Riley & Scarborough LLP

(57) ABSTRACT

A vehicle hatch with a clamping system and a lid assembly. The clamping system contains a trim ring and a frame assembly, with the frame assembly having a frame with an inner frame wall. The frame and the trim ring are held together by one or more screws inserted through the trim ring and into the frame for clamping the vehicle hatch to a vehicle roof. The lid assembly has an outer lid and an inner lid. The lid assembly is attached to the frame on the inner frame wall by a link and plunger assembly connected to the frame, and the vehicle hatch has a closed position and a vented position.

18 Claims, 54 Drawing Sheets

(56) References Cited

U.S. PATENT DOCUMENTS

| | | | | |
|---|---|---|---|---|
| 4,130,966 A | * | 12/1978 | Kujawa, Jr. | B60J 7/1642 49/141 |
| 4,154,474 A | * | 5/1979 | Hough | B60J 7/1642 296/218 |
| 4,231,609 A | * | 11/1980 | Sorensen | B60J 7/1642 296/218 |
| 4,412,404 A | * | 11/1983 | Manning | B60J 7/1642 52/72 |
| 4,433,506 A | | 2/1984 | Manning | |
| 4,495,731 A | | 1/1985 | Sears | |
| 4,592,269 A | | 6/1986 | Lamparter | |
| 4,723,812 A | * | 2/1988 | Masuda | B60J 7/11 292/277 |
| 4,783,116 A | * | 11/1988 | Hough | B60R 13/0231 296/218 |
| 4,895,065 A | | 1/1990 | Lamparter | |
| 4,964,673 A | | 10/1990 | Lamparter | |
| 5,137,327 A | * | 8/1992 | Edmonds | B60J 9/02 16/259 |
| 5,524,955 A | * | 6/1996 | Brocke | B32B 17/10036 52/204.597 |
| 6,540,288 B1 | | 4/2003 | Tobin | |
| 6,572,182 B2 | | 6/2003 | Lamparter et al. | |
| 6,609,750 B1 | | 8/2003 | Cauduro | |
| 7,140,959 B2 | | 11/2006 | Haigh et al. | |
| 7,166,023 B2 | | 1/2007 | Haigh et al. | |
| 7,168,146 B2 | * | 1/2007 | Hord | B60J 7/1642 264/273 |
| D553,048 S | | 10/2007 | Butz | |
| 8,746,485 B1 | * | 6/2014 | Tiefenthaler | B60K 15/0406 220/255 |
| 9,597,948 B2 | * | 3/2017 | Butz | B60J 7/19 |
| 2003/0106200 A1 | | 6/2003 | Tobin | |
| 2005/0095973 A1 | | 5/2005 | Haigh et al. | |
| 2008/0139101 A1 | * | 6/2008 | Bickel | B60H 1/262 49/342 |
| 2009/0084300 A1 | * | 4/2009 | Kyle | B63B 19/26 114/201 R |
| 2016/0319121 A1 | * | 11/2016 | Kitayama | C08L 33/24 |

FOREIGN PATENT DOCUMENTS

| | | |
|---|---|---|
| CA | 2475982 C | 2/2014 |
| DE | 10392768 B4 | 11/2012 |
| WO | 2004000587 A2 | 12/2003 |

* cited by examiner

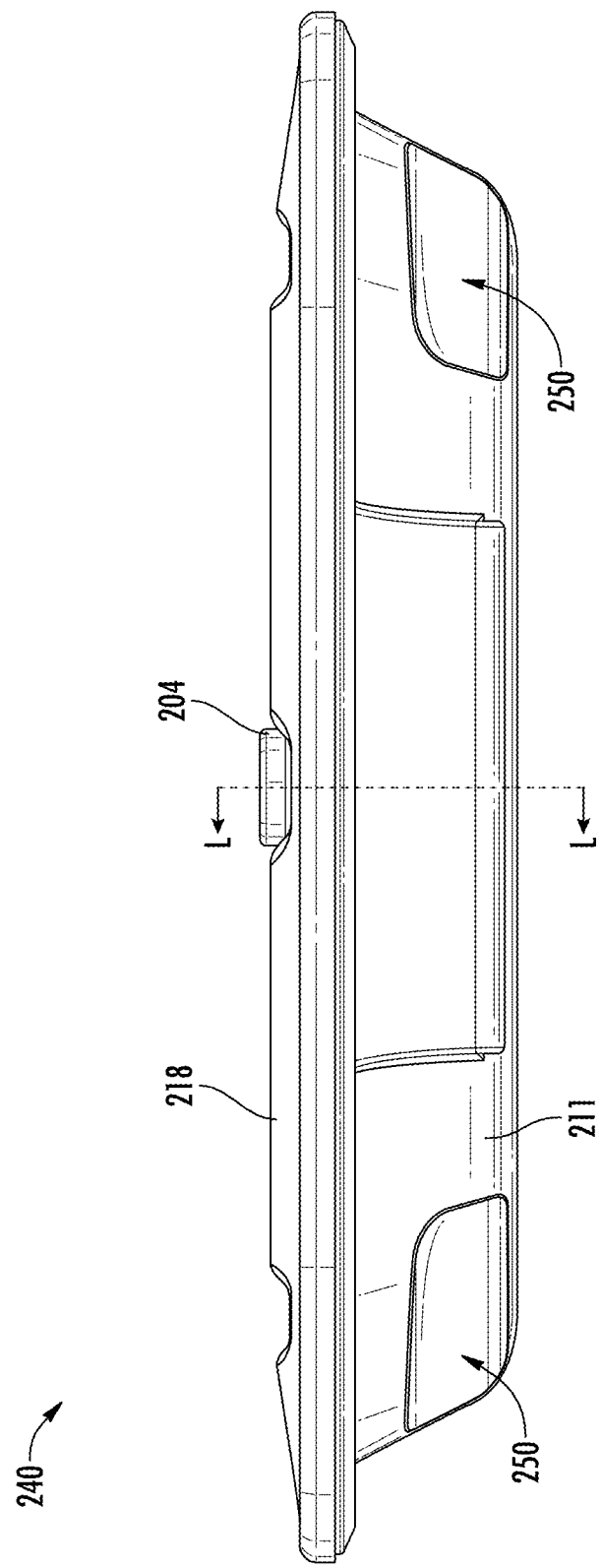

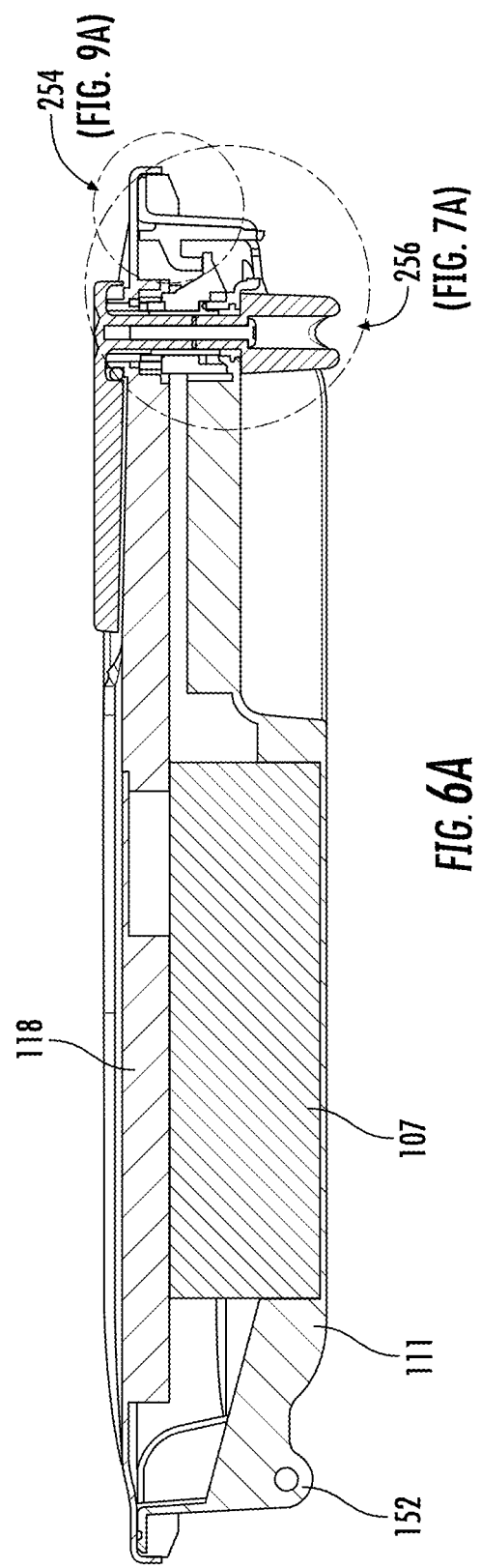

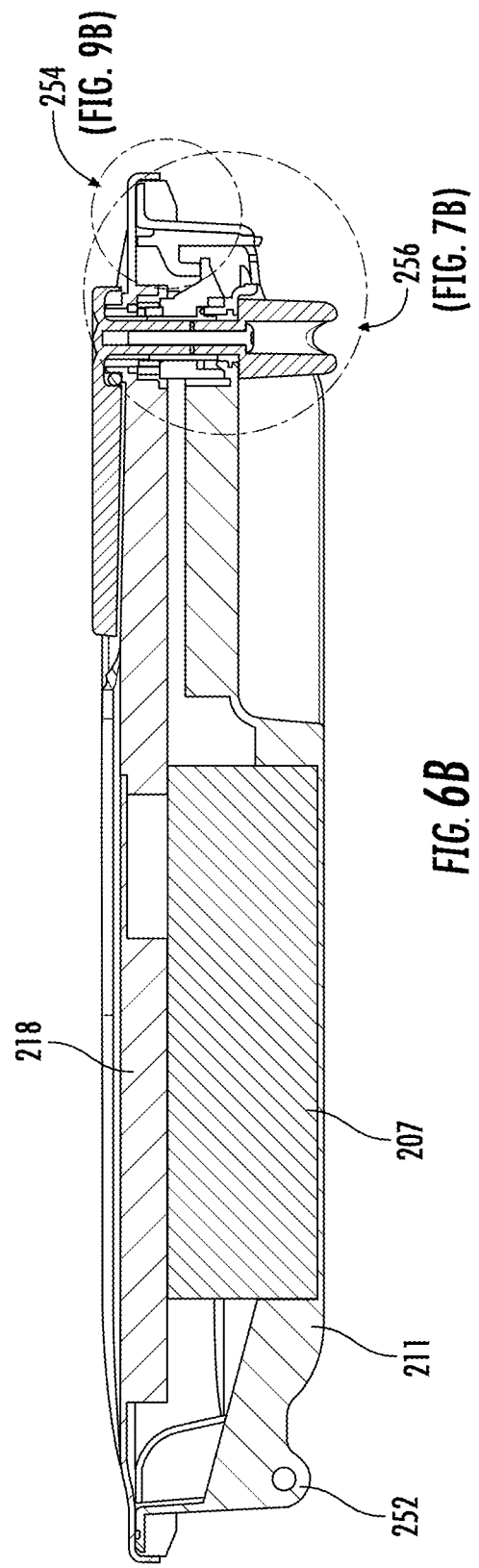

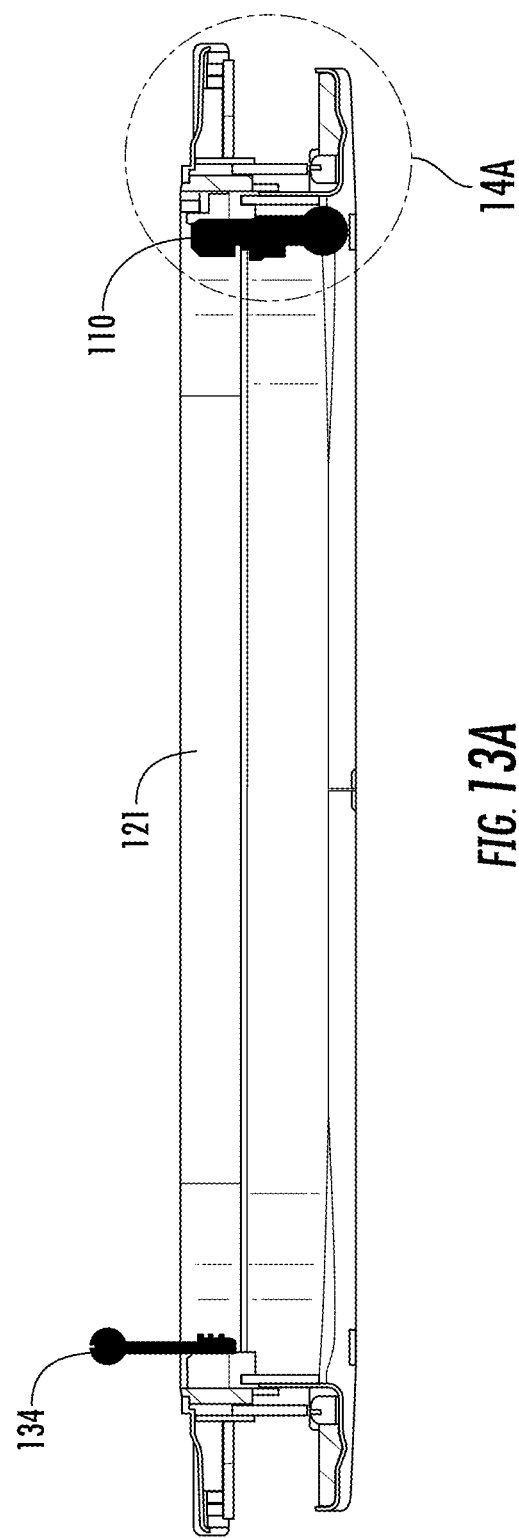

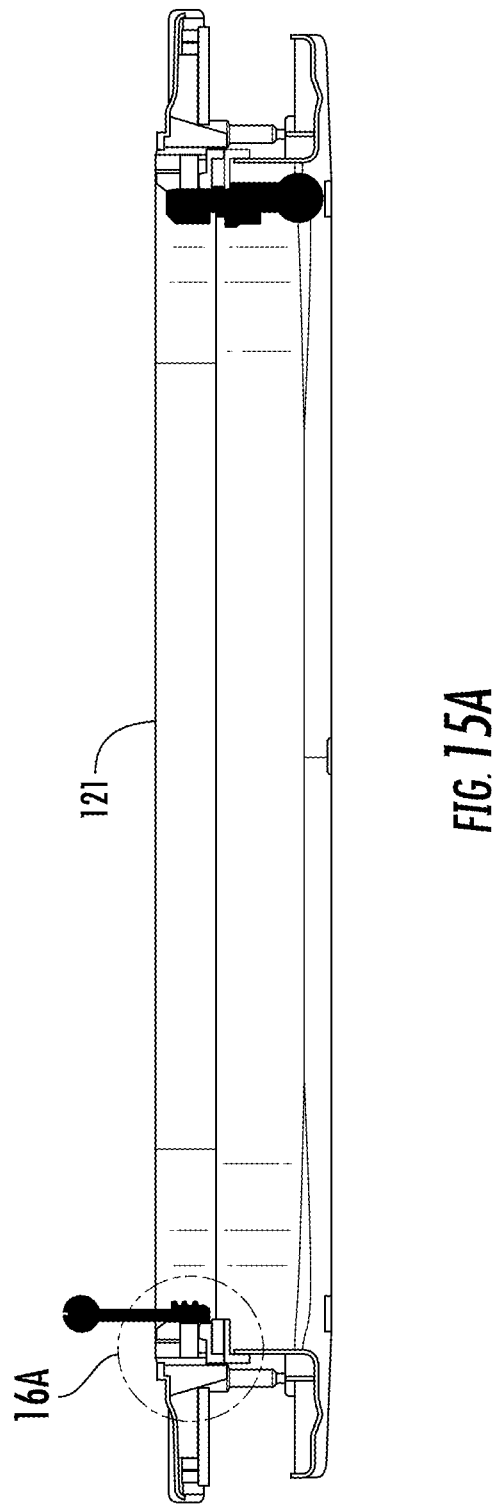

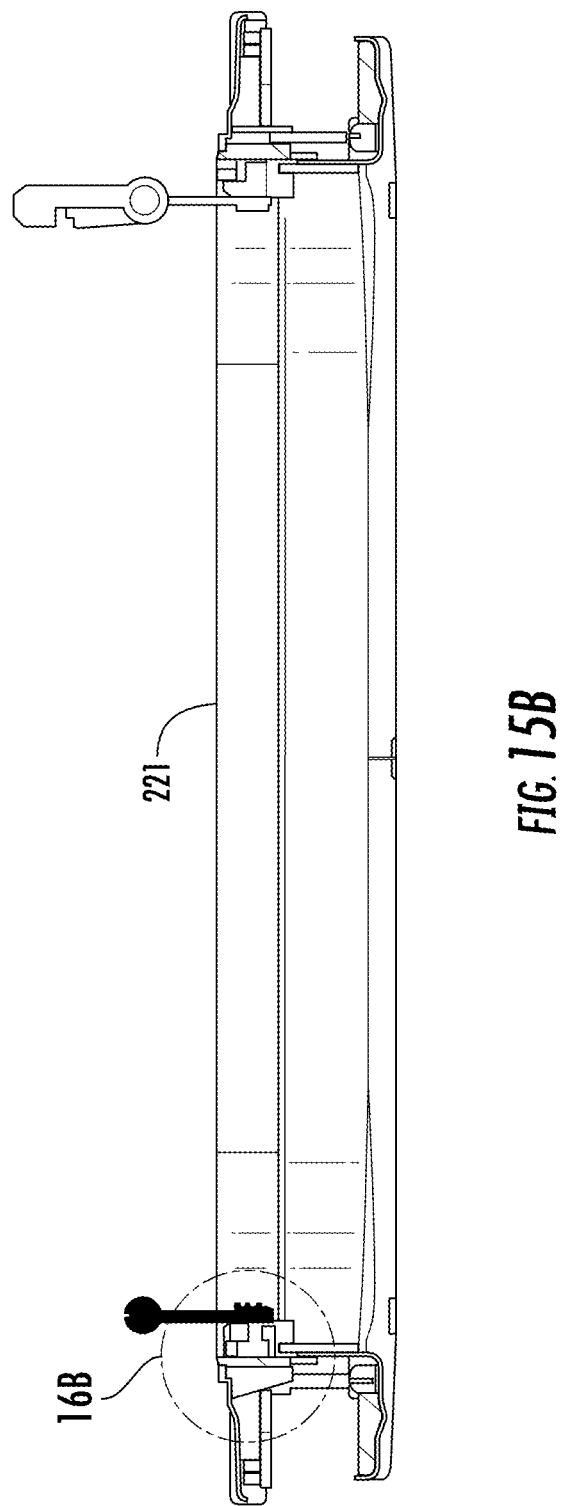

VEHICLE HYBRID SAFETY HATCH

CROSS-REFERENCE TO RELATED APPLICATION

This application is based upon and claims priority to Provisional Application No. 62/970,771, filed Feb. 6, 2020. This Provisional Application is incorporated fully herein by reference for all purposes.

FIELD OF THE INVENTION

The present invention relates to a vehicle safety hatch, more particularly to a hybrid vehicle safety hatch having features of both a vehicle emergency escape roof hatch and an air vent.

BACKGROUND OF THE INVENTION

Current vehicle safety hatches are difficult to install in a vehicle and generally require a significant amount of effort to seal properly and to prevent water leaks. These hatches often comprise a large number of parts, making installation more difficult and creating an increased risk of failure for one of the parts. Ergonomics of handle design and placement need improvement. Hatches are often noisy and possess poor insulation, allowing the temperature of the vehicle to be unduly impacted by the external temperature. Further, the cosmetic appearance of these vehicle safety hatches is poor with most screws and fasteners being visible. There is a need in the industry for an improved hatch having an overall safer design and making the hatch easier for the end user to interact with when needed.

SUMMARY OF THE INVENTION

The present invention relates to a vehicle safety hatch. Embodiments may comprise features of both a vehicle emergency escape roof hatch and an air vent. In one embodiment, a vehicle hatch is provided. This vehicle hatch comprises a clamping system having a trim ring. The vehicle hatch also comprises a frame assembly having a frame, and the frame and the trim ring are fastened together so that the vehicle hatch is configured to be secured to a vehicle roof. The vehicle hatch also comprises a lid assembly comprising a latch, and the latch is configured to move between a first position and a second position. The lid assembly is configured to shift between an unvented position and a vented position. In the unvented position, the lid assembly rests on the frame. In the vented position, the lid assembly is elevated above the frame.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 5B is a front view of the lid assembly of the vehicle hatch of FIG. 1C in accordance with a second embodiment of the present invention.

FIG. 6A is a sectional view of Section L-L of the vehicle hatch of FIG. 5A in accordance with a first embodiment of the present invention.

FIG. 6B is a sectional view of Section L-L of the vehicle hatch of FIG. 5B in accordance with a second embodiment of the present invention.

FIG. 13A is a sectional view of Section Y-Y of the frame assembly of FIG. 12A in accordance with a first embodiment of the present invention.

FIG. 15A is a sectional view of Section T-T of the frame assembly of FIG. 12A in accordance with a first embodiment of the present invention.

FIG. 15B is a sectional view of Section T-T of the frame assembly of FIG. 12B in accordance with a second embodiment of the present invention.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Applicant notes that like numerals (e.g. 104, 204, 304) are intended to refer to similar components within various embodiments. Further, numerals in the hundreds are intended to refer to the same embodiment, numerals in the two-hundreds are intended to refer to a second embodiment, etc.

Figure 1A:
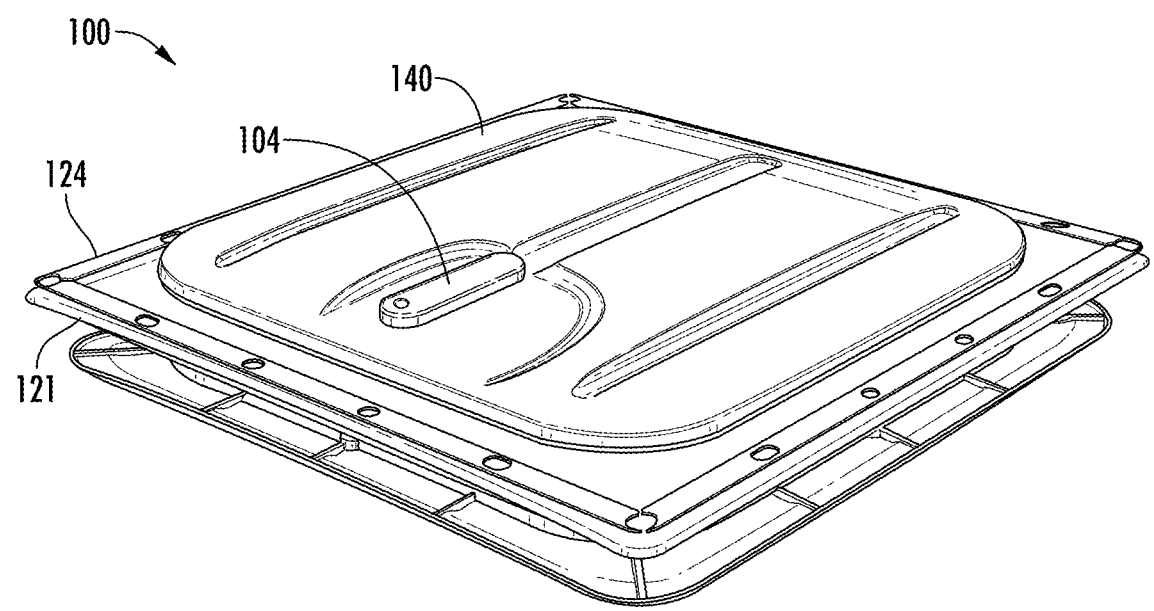
FIG. 1A is a perspective view of a vehicle hatch in a closed (unvented) position in accordance with a first embodiment of the present invention.
Figure 1B:
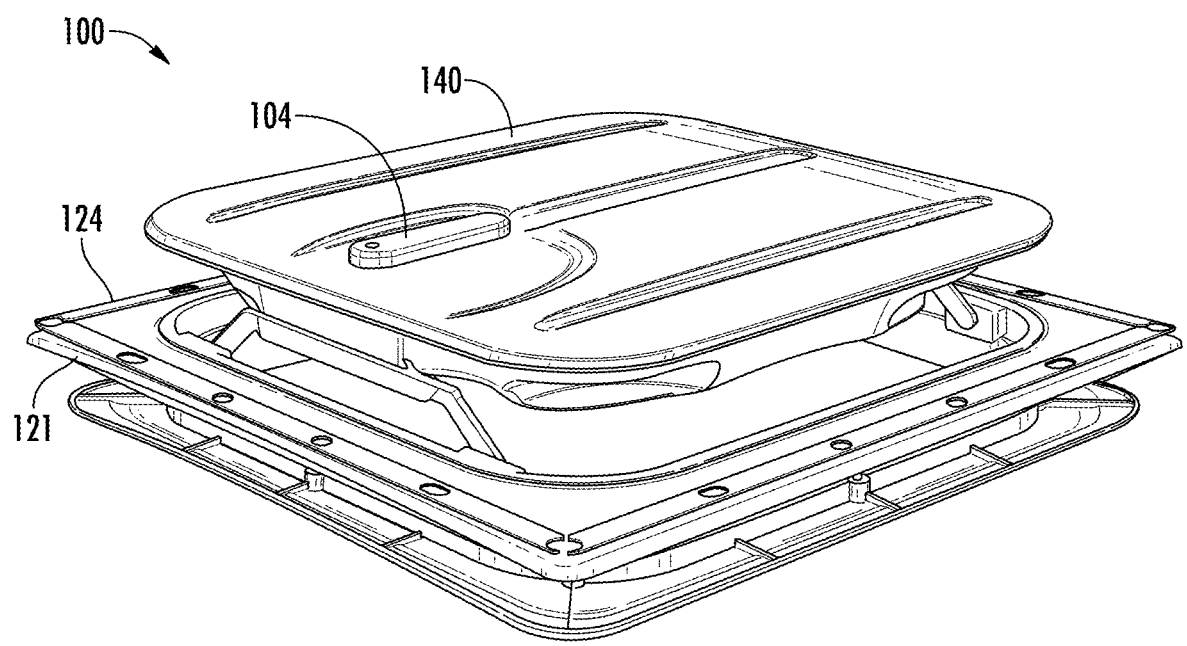
FIG. 1B is a perspective view of the vehicle hatch of FIG. 1A in an open (vented) position in accordance with a first embodiment of the present invention.
Figure 1C:
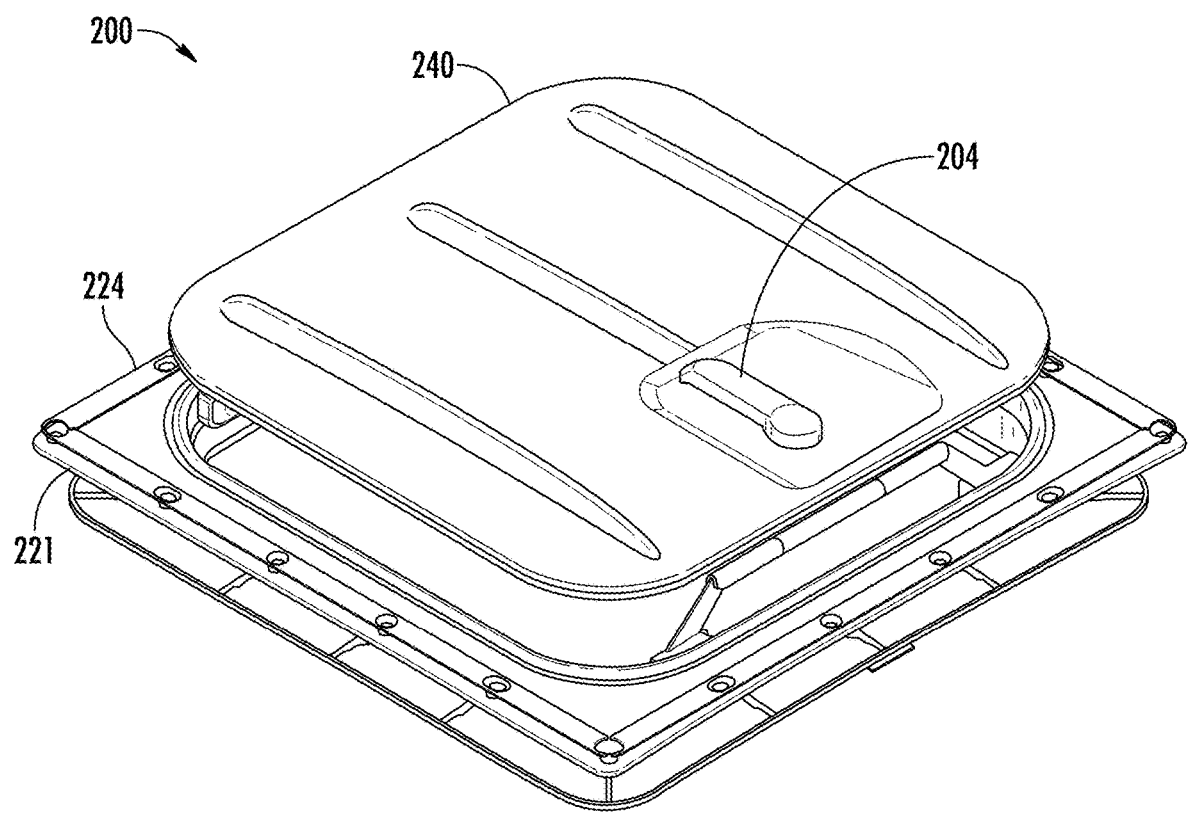
FIG. 1C is a perspective view of another vehicle hatch in an open (vented) position in accordance with a second embodiment of the present invention.

Referring to the figures, FIG. 1A is a perspective view of a vehicle hatch 100 in a closed (unvented) position in accordance with a first embodiment of the present invention. FIG. 1B is a perspective view of vehicle hatch 100 in an open (vented) position in accordance with a first embodiment of the present invention. FIG. 1C is a perspective view of a second vehicle hatch 200 in an open (vented) position in accordance with a second embodiment of the present invention.

Vehicle hatch 100, 200 may be a hybrid. The term "hybrid", as used herein, refers to the vehicle hatch having features of both a vehicle emergency escape roof hatch and an air vent. Vehicle hatch 100, 200 may be opened using outside release handle 104, 204 (or an inside release handle 108, 208 (FIGS. 2A-2B)) to allow for egress or ingress when desired, allowing the lid assembly 140, 240 to be elevated relative to other components of the vehicle hatch 100, 200 such as the frame 121, 221. When closed, the vehicle hatch 100, 200 may prevent outside elements from entering from inside the vehicle. Examples of vehicles for use with the hatch of the present invention include, but are not limited to, school buses, transit buses, recreational vehicles (RV), limos, commercial vehicles, transit vehicles, and passenger vehicles. Vehicle hatch 100, 200 may comprise one or more decal(s) such as an OSR instruction decal, an emergency exit decal, and a frame decal (white retroreflective striping) 124, 224.

Figure 2A:
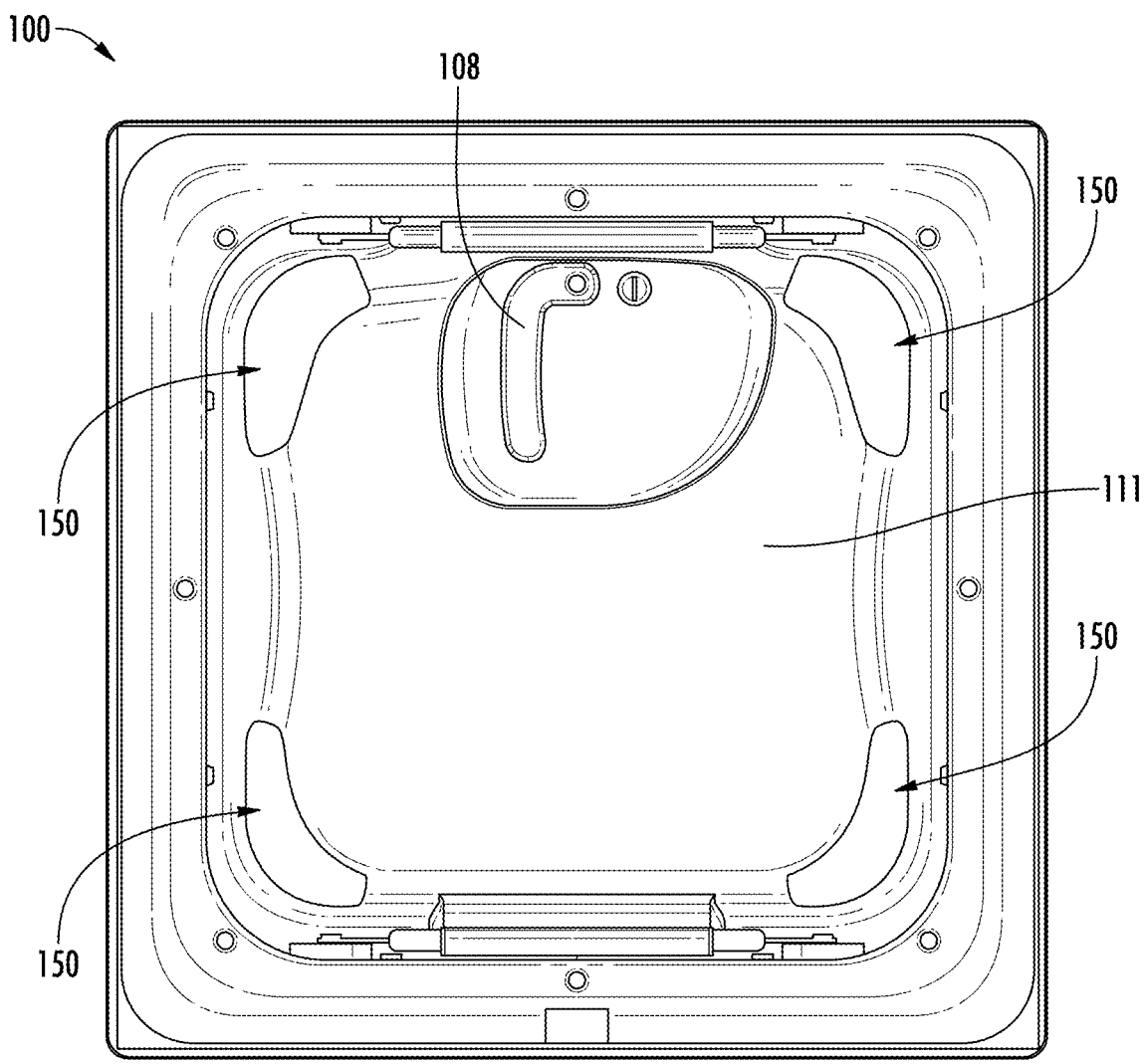
FIG. 2A is an inside view of the vehicle hatch of FIG. 1A in accordance with a first embodiment of the present invention.
Figure 2B:
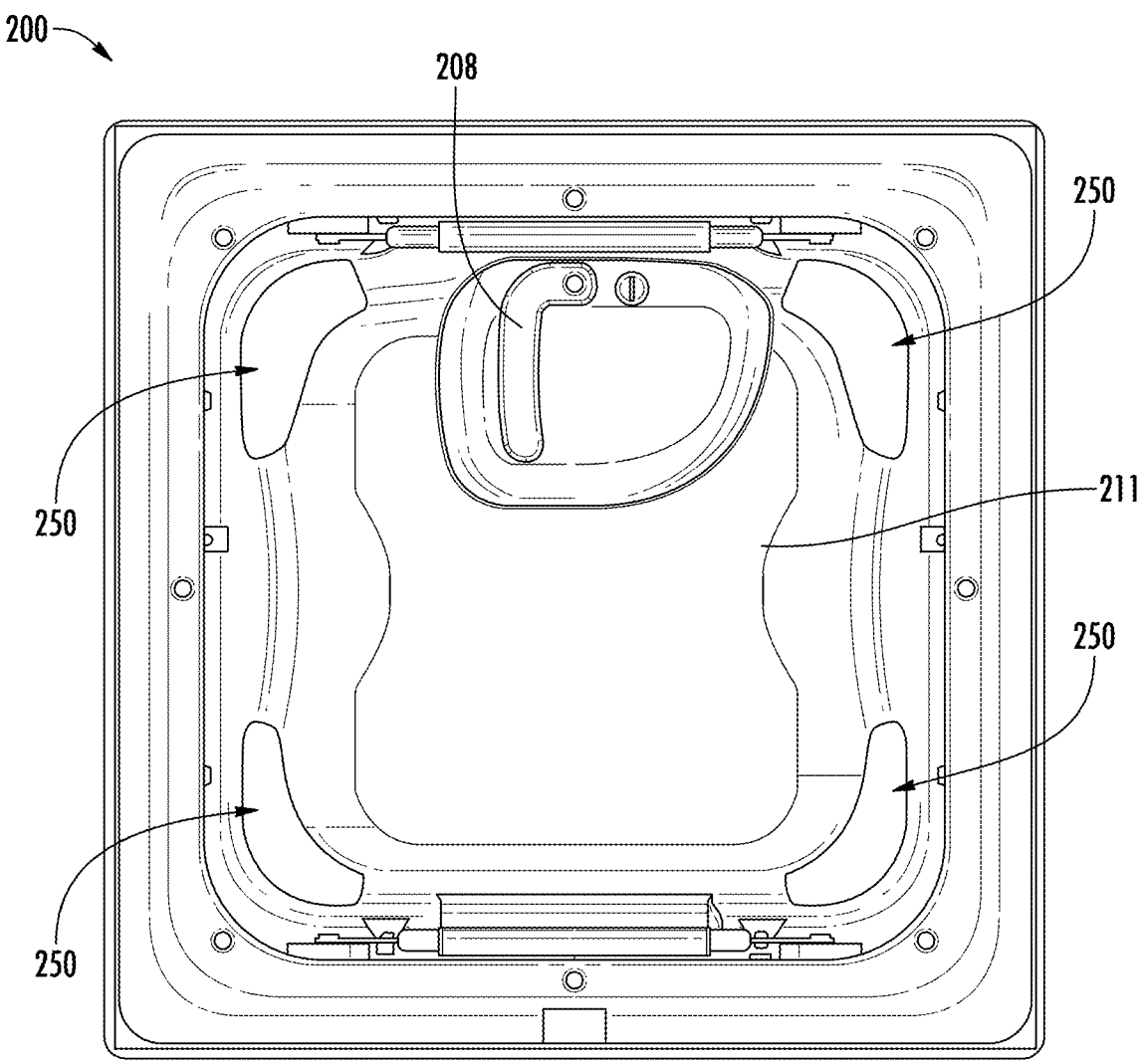
FIG. 2B is an inside view of the vehicle hatch of FIG. 1C in accordance with a second embodiment of the present invention.

FIG. 2A is an inside view of vehicle hatch 100 of FIG. 1A, and FIG. 2B is an inside view of vehicle hatch 200 of FIG. 1C. To open vehicle hatch 100, 200 from the inside, an inside release handle 108, 208 may be turned counterclockwise a quarter turn and pushed to open. Handles 150, 250 may be provided at each corner of the inner lid 111, 211. In other embodiments, inside release handle 108, 208 may be configured differently so that the vehicle hatch is opened by turning the handle clockwise or by turning the handle a different amount.

Figure 3A:
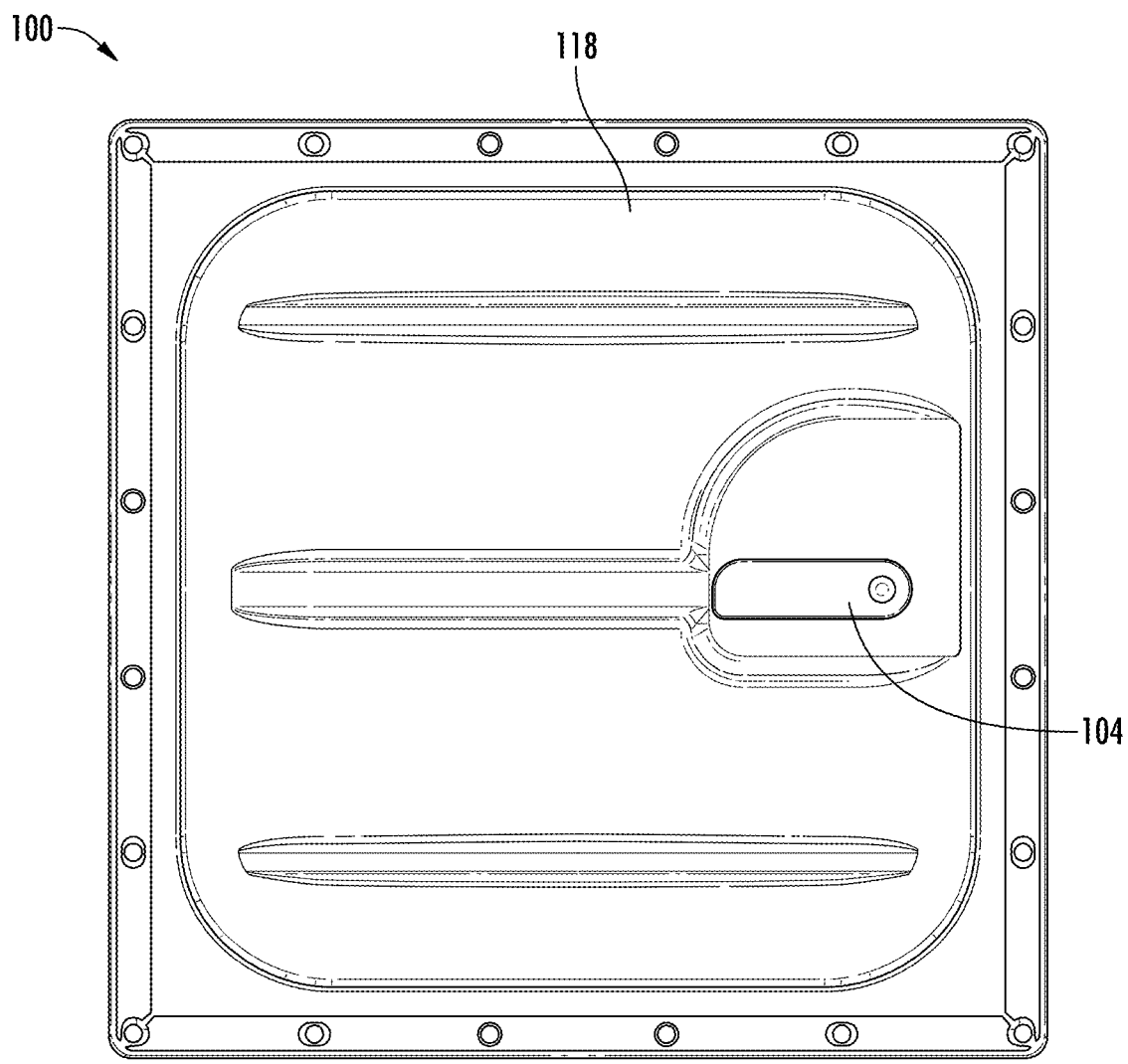
FIG. 3A is an outside view of the vehicle hatch of FIG. 1A in accordance with a first embodiment of the present invention.
Figure 3B:
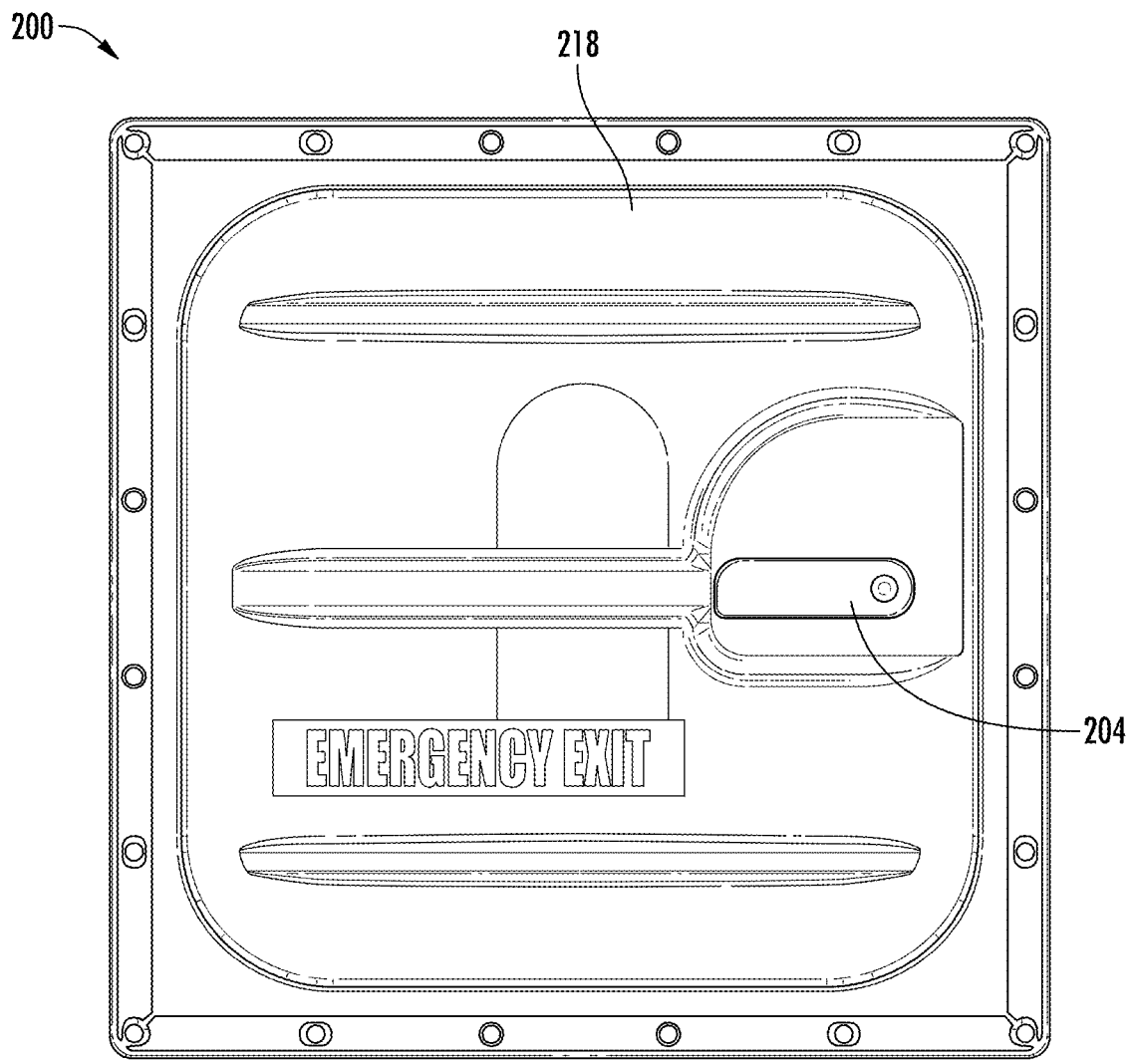
FIG. 3B is an outside view of the vehicle hatch of FIG. 1C in accordance with a second embodiment of the present invention.

FIG. 3A is an outside view of vehicle hatch 100 of FIG. 1A, and FIG. 3B is an outside view of vehicle hatch 200 of FIG. 1C. From the outside, an outside release handle 104, 204 may be turned clockwise a quarter turn and pulled. However, outside release handle 104, 204 may be configured differently so that the vehicle hatch is opened by turning the handle counterclockwise or by turning the handle a different amount. Vehicle hatch 100, 200 may also be vented by pushing up from the inside on inner lid 111, 211 (FIGS. 2A, 2B) without rotating the inside release handle or outside release handles. The vented position of vehicle hatch 100, 200 may create a two to three inch air gap around inner and outer lids of lid assembly 140, 240 (FIGS. 4A and 4B) and the frame 121, 221, allowing for outside air to enter into the vehicle. This air gap may be larger or smaller in other embodiments. Venting may be independent at the front and/or back of the outer lid, allowing one side of the lid to be in an elevated vented position while another side is in an unvented position.

Figure 4A:
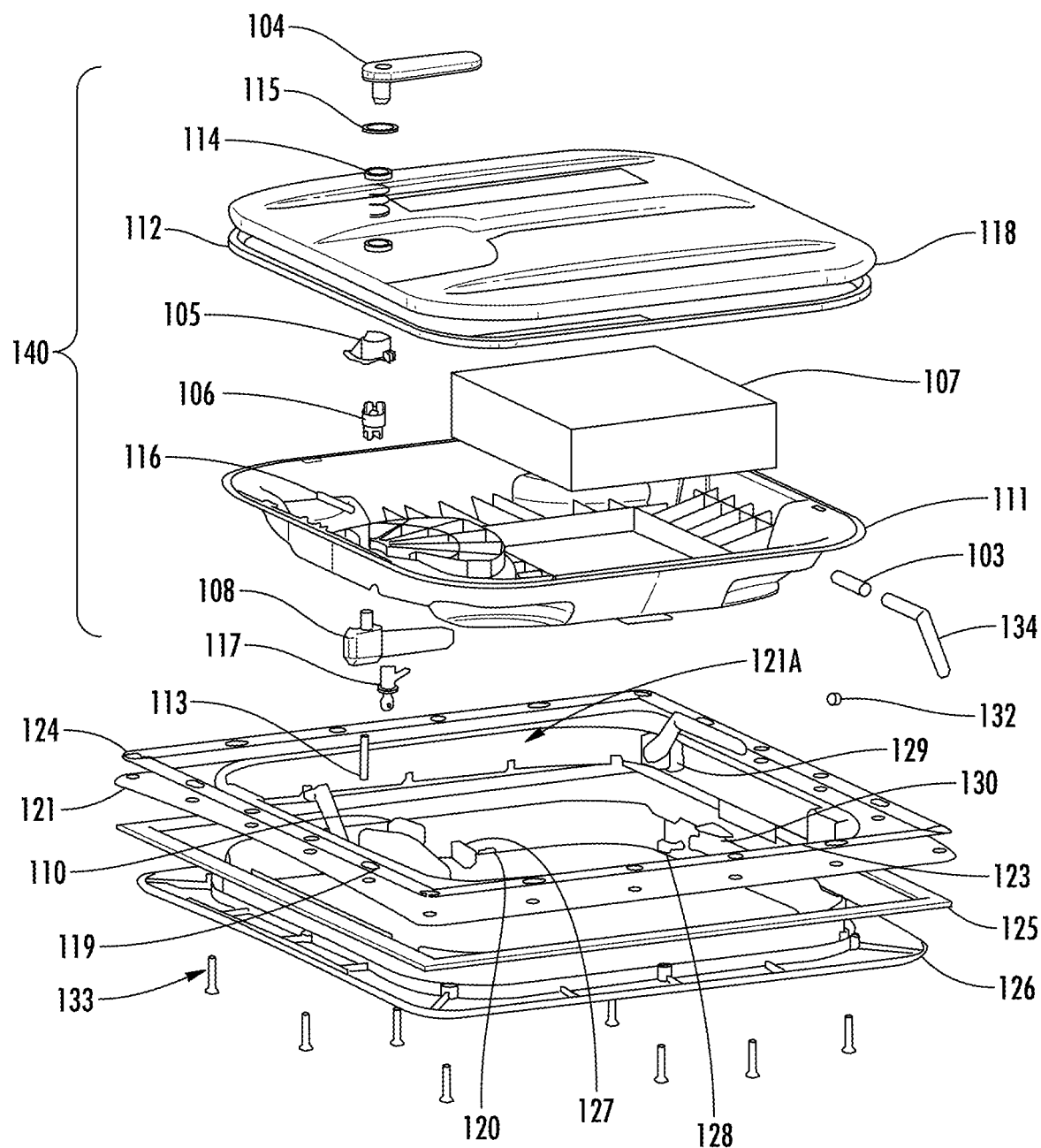
FIG. 4A is an exploded view of the vehicle hatch of FIG. 1A in accordance with a first embodiment of the present invention.
Figure 4B:
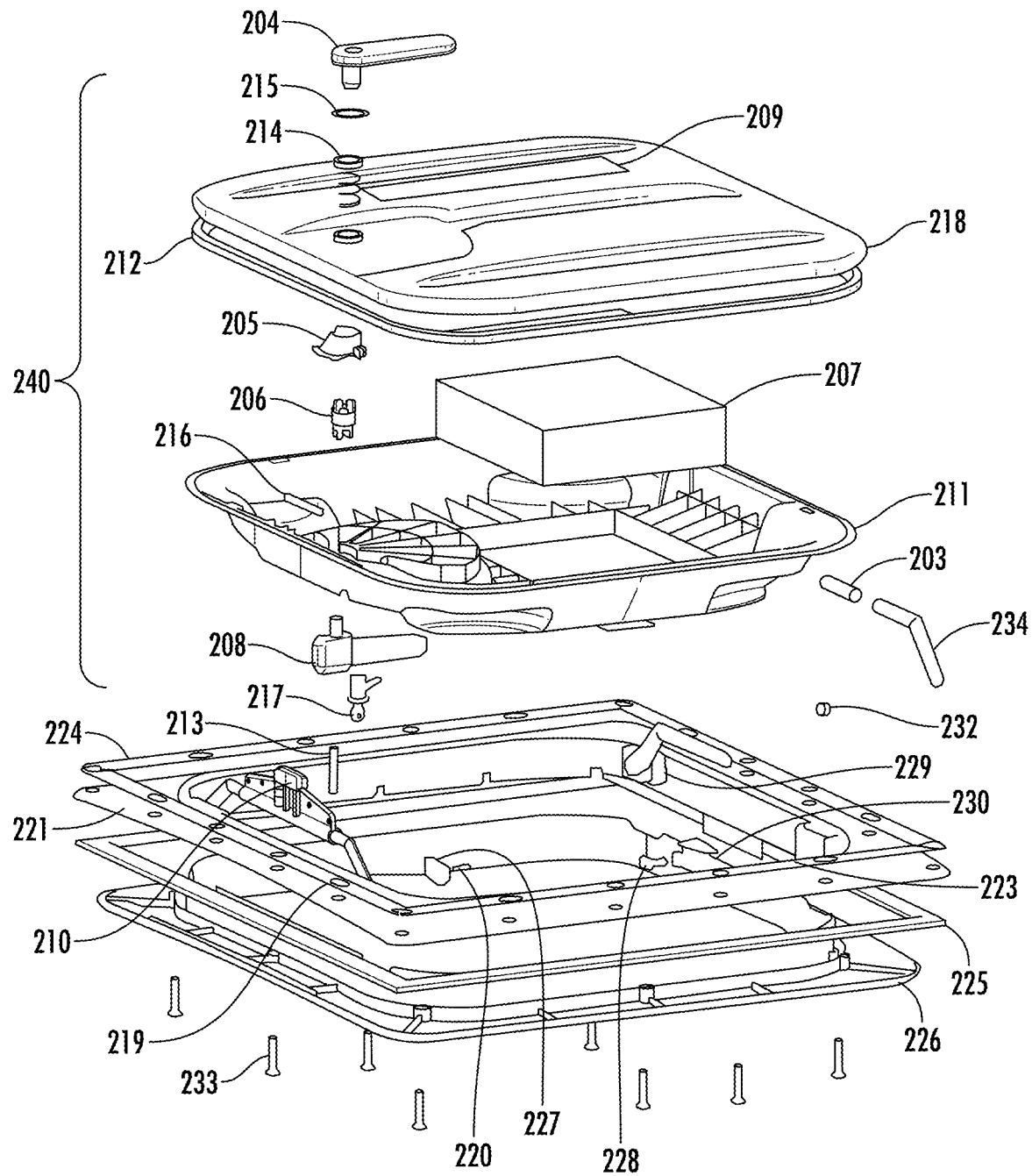
FIG. 4B is an exploded view of the vehicle hatch of FIG. 1C in accordance with a second embodiment of the present invention.
Figure 4C:
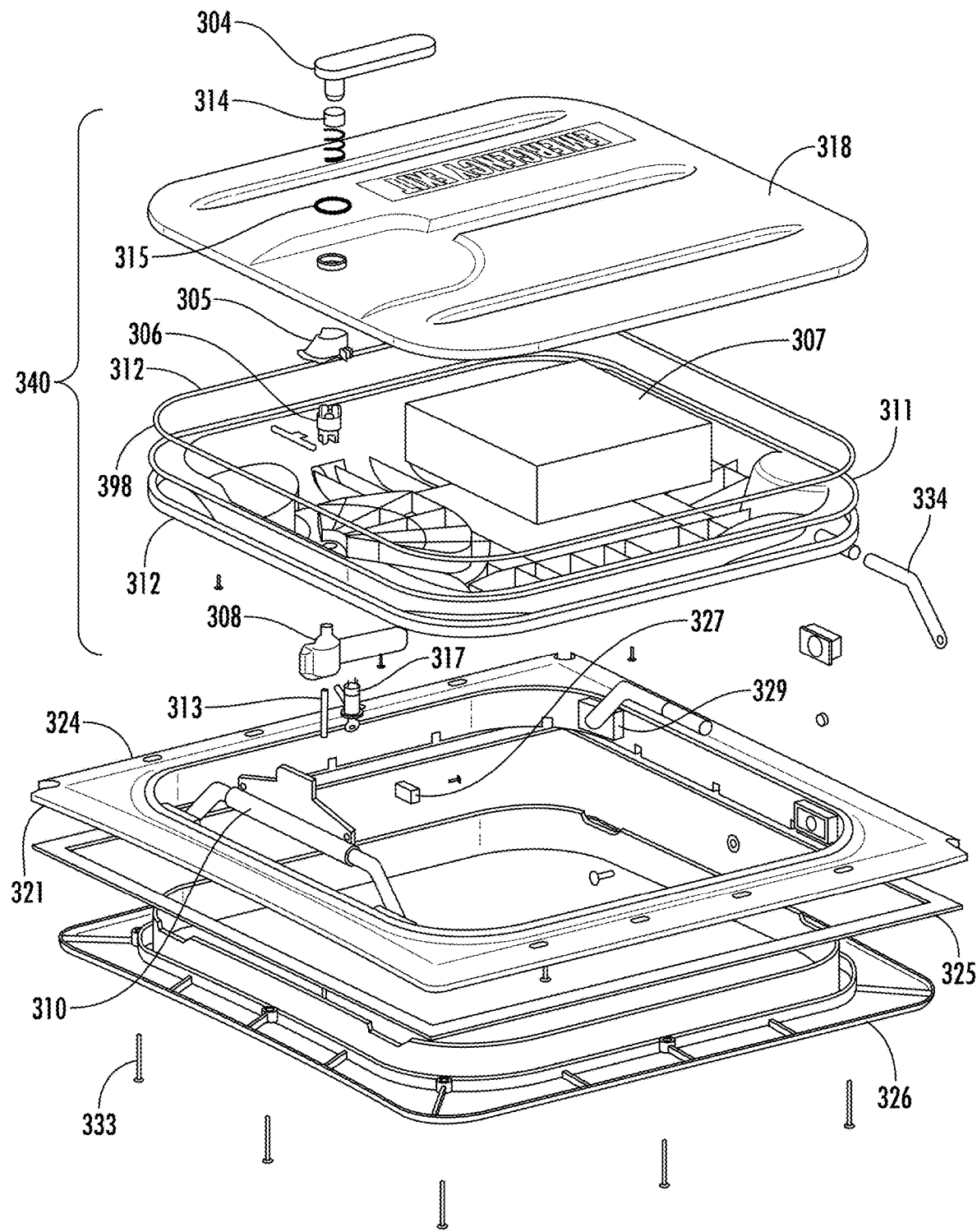
FIG. 4C is an exploded view of another vehicle hatch in accordance with a third embodiment of the present invention.

FIG. 4A is an exploded view of vehicle hatch 100 of FIG. 1A in accordance with a first embodiment of the present invention, FIG. 4B is an exploded view of vehicle hatch 200 of FIG. 1C in accordance with a second embodiment of the present invention, and FIG. 4C is an exploded view of a vehicle hatch 300 in accordance with a third embodiment of the present invention. Vehicle hatch 100, 200, 300 may generally comprise a trim ring 126, 226, 326, a frame 121, 221, 321, and a lid assembly 140, 240, 340.

Vehicle hatches 100, 200, 300 may be installed into a cutout of a vehicle roof, with the cutout typically being a 24-inch by 24-inch square. Vehicle hatches may attach using a clamping system comprised of a frame 121, 221, 321 and a trim ring 126, 226, 326, and these two parts may be fastened together, clamping a vehicle roof in between. An adhesive sealant 125, 225, 325 may be pre-applied at the underside of frame to seal the vehicle roof to the frame and prevent water from passing. Lid assembly 140, 240, 340 may be fixed to the frame.

Lid assembly may be assembled with inside and outside halves referred to herein as an inner lid 111, 211, 311 and outer lid 118, 218, 318. Inner lid and outer lid may be glued and/or snapped together. The inside and outside lid features may be screwed together design with six screw bosses 290, 390 (FIGS. 10B-10C) molded into the lid around the perimeter. This may mechanically hold inner lid and outer lid together and can be used as an alternative or supplement to gluing. These screw bosses 290, 390 may also improve the cosmetic appearance of the hatch by reducing the visibility of the screws or other fasteners. A caulk like rope 398 (FIG. 8C) and/or a rope shaped sealant may be applied between the inner lid 311 and outer lid 318 to prevent water entry in between these pieces. An additional gasket and/or another sealant 112, 212, 312 may be inserted as well between the inner lid and the frame. Snap configurations on the lid assembly 140, 240, 340 may aid in holding the lid assembly pieces together before the screws and/or glue are secured. The snap together lids may allow for glue cure without fixturing and may also allow for a quicker assembly time.

Before the inner lid 111, 211, 311 and outer lid 118, 218, 318 are mated, a foam core 107, 207, 307 as a lid insert, a handle bushing 106, 206, 306, and a rotating locker or latch 105, 205, 305 may be placed between the inner and outer lids and held in place when inner and outer lids are assembled. The foam core may take the shape of a block. Once inner lid and outer lid are together, inside release handle 108, 208, 308 and outside release handle 104, 204, 304 may be inserted into holes in the inner or outer lid. A screw 113, 213, 313 may be inserted through inside release handle 108, 208, 308 into a boss feature on outside release handle 104, 204, 304. This screw 113, 213, 313 may assist in fastening the inside release handle and outside release handles together. A cam lock 117, 217, 317 may also be provided, and this cam lock may be configured to prevent the lid assembly from being opened when the cam lock is in a locked position. The lid assembly 140, 240, 340 and the frame assembly comprising frame 121, 221, 321 may be placed from the outside into the vehicle roof cutout. Trim ring 126, 226, 326 may be inserted from the inside of the vehicle into the hole cutout and may nested inside of the frame wall 121, 221, 321 (see FIGS. 14A and 14B; see also FIGS. 4A-4C). Trim ring 126, 226, 326 may have multiple thru-hole bosses, shown as eight thru-hole bosses, that each allow for a shaft(s) of screw(s) 133, 233, 333 to be inserted and screwed into corresponding bosses in frame 121, 221, 321. Screw(s) 133, 233, 333 may clamp and hold all of the components to the vehicle roof. Lid assembly 140, 240, 340 may be attached to the frame 121, 221, 321 at four bosses on the inside of frame wall 121 221A, 321 with four two-piece link and plunger assemblies 134, 234, 334 bolted to frame 121, 221, 321. The link and plungers of the link and plunger assemblies 134, 234, 334 may rotate freely about bolts 128, 228 on the frame, but another component may provide a fulcrum in other embodiments. Further, one end of the link and plungers may slide into contact with a contact surface 158, 258 inside fixed or front hinges 152, 252 molded into the lid at the front (shown in FIGS. 6A and 6B), and a second end may slide inside a striker 110, 210, 310 at the back/latch side. The front of inner lid 111, 211, 322 of the lid assembly may be capable of pivoting about the plunger body's central axis (open and close), but the inner lid may be prevented from detaching from frame 121, 221, 321. The hinge side (rear) of the lid assembly 140, 240, 340, may attach to a striker 110, 210, 310 that is locked in a vertical orientation via a tongue and groove feature inside the striker. The link and plungers of the link and plunger assemblies 134, 234, 334 may be connected together via a pin at a fulcrum. The lid assembly height while in the vented position may be controlled by limited angular movement of the link ends of the link and plunger assemblies 134, 234, 334 interfering with the plunger body at an angle. Both front and rear sets of plungers may use springs 203 (FIG. 11B) to maintain tension on lid assembly 140, 240, 340 in the vented and unvented positions. When lid assembly 134, 234, 334 is unvented, inner lid 111, 211, 311 may rest against frame 121, 221, 321 with a weather resistant gasket 112, 312 in between. When lid assembly 140, 240, 340 is latched, the striker 110, 210, 310 may be held inside lid assembly by the rotating locker/latch 105, 205, 305, and the rotating locker/latch may be moved into the closed position via the inside release handle 108, 208, 308 or the outside release handle 104, 204, 304 (operated by the user). The rotating locker/ latch 105, 205, 305 may be guided vertically and axially via center interlocking handle bushing 106, 206, 306, which may rest between the inside and outside release handles. The rotating locker/latch 105, 205, 305 may be guided vertically and axially by a groove molded into inner lid 111, 211, 311. A spring 114, 214, 314 around the outside handle boss may maintain pressure on the rotating locker/latch 105, 205, 305 to prevent rattling and keeps it in contact with a groove in inner lid 111, 211, 311. The inside release handle 108, 208, 308 and outside release handle 104, 204, 304 may be screwed together with a single screw, or these components may be secured by other fasteners. A screw shaft may pass through the center of the bushing 106, 206, 306.

As illustrated in FIGS. 4A, 4B, and 4C, the outside release handle 104, 204, 304 may be inserted into an outside handle o-ring 115, 215, 315. Decal(s) may also be present on the vehicle hatch such as a decal with OSR instructions, a decal with an emergency exit label, a frame decal 124, 224, 324 with white retroreflective striping, a hybrid safety vent III decal 130, 230, and front of vehicle decal 123, 223.

Among other vehicle hatch components shown in FIGS. 4A-4C for purposes of assembly of vehicle hatch 100, 200, 300 are a gasket (hollow with tension wire lid) 112, 212, a tension spring for snap in lid 116, 216, 316, a hatch plunger spring 103, 203, a lock (cam with microswitch) 117, 217, 317, a screw 113, 213, 313, a locknut 132, 232, a left hand (LH) and right hand (RH) covers 129, 229, 329, a hex nut 119, 219, a threaded hole 120, 220, an alarm switch (hatch ajar) 127, 227, 327, a shoulder bolt 128, 228, 328, and a washer. Covers 129, 229, 329 may be secured to the frame, and the covers may be snap on covers in some embodiments. These components and other components may be shown in the subsequent figures.

Figure 5A:
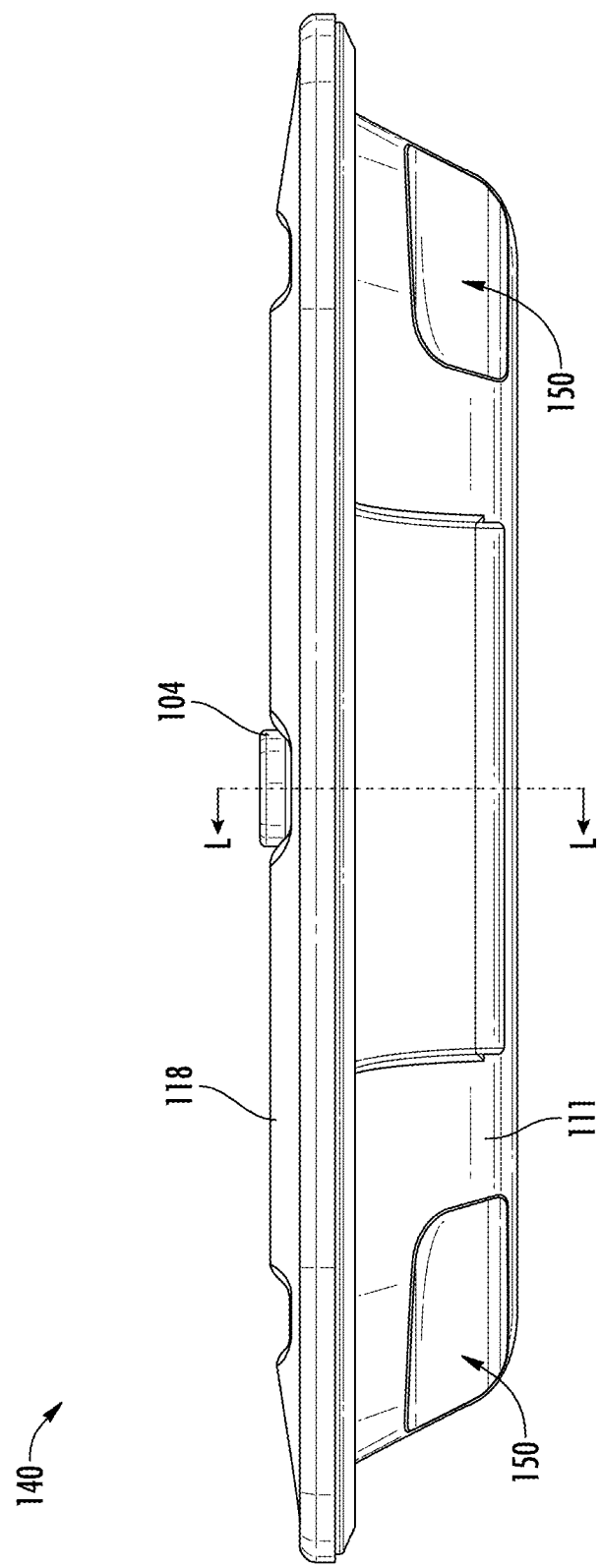
FIG. 5A is a front view of the lid assembly of the vehicle hatch of FIG. 1A in accordance with a first embodiment of the present invention.

FIG. 5A is a front view of the lid assembly 140 of vehicle hatch 100 of FIG. 1A in accordance with a first embodiment of the present invention, and FIG. 5B is a front view of the lid assembly 240 of vehicle hatch 200 of FIG. 1C in accordance with a second embodiment of the present invention. As shown in FIGS. 5A-5B, one or more handles 150, 250 may be molded into one or more corner(s) of the inner lid 111, 211. This may make the hatch assembly easier to install, less likely to be broken, and may also be easier to use.

FIG. 6A is a sectional view of Section L-L of the lid assembly 140 of FIG. 5A in accordance with a first embodiment of the present invention, and FIG. 6B is a sectional view of Section L-L of the lid assembly 240 of FIG. 5B in accordance with a second embodiment of the present invention. Fixed or front hinges 152, 252 may be integrated into inner lid 111, 211. Foam core 107, 207 may be inserted between inner lid 111, 211 and outer lid 118, 218. The foam cores 107, 207 may improve strength of the lid assemblies, reduce noise, and act as insulation in between inner lid 111, 211 and outer lid 118, 218.

Figure 9A:
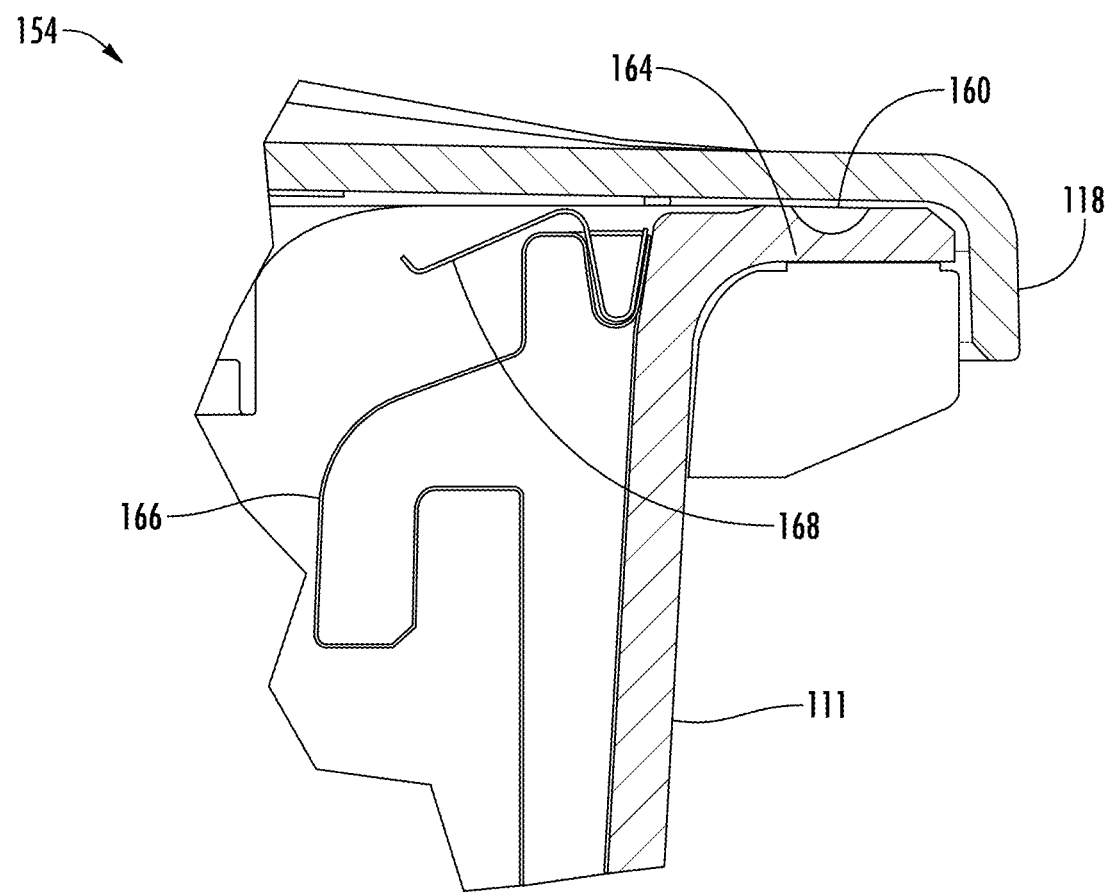
FIG. 9A is an enlarged view of the lid edge shown in FIG. 6A in accordance with a first embodiment of the present invention.
Figure 9B:
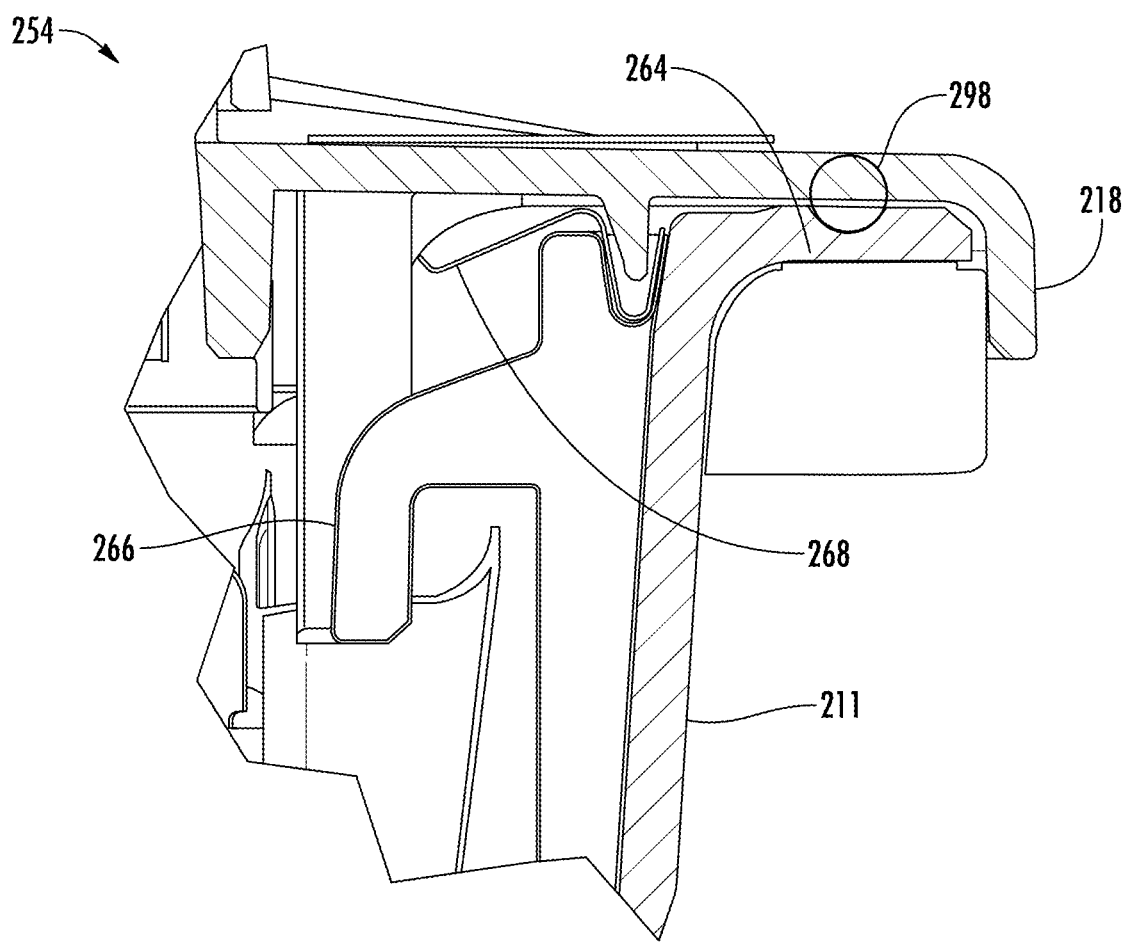
FIG. 9B is an enlarged view of the lid edge shown in FIG. 6B in accordance with a second embodiment of the present invention.

A lid edge 154, 254 is illustrated, with FIGS. 9A and 9B illustrating enlarged views of these lid edges 154, 254. FIGS. 6A and 6B also illustrate a handle assembly 156, 256, which is illustrated in greater detail in FIGS. 7A and 7B. Handle assemblies 156, 256 may improve ease-of-use, simplify operation of the hatch, and allow for latching and unlatching of the hatch while in unvented (closed) position. In some embodiments, the handle assemblies 156, 256 may also permit latching and unlatching of the hatch while the lid assembly is in a vented position.

Figure 7A:
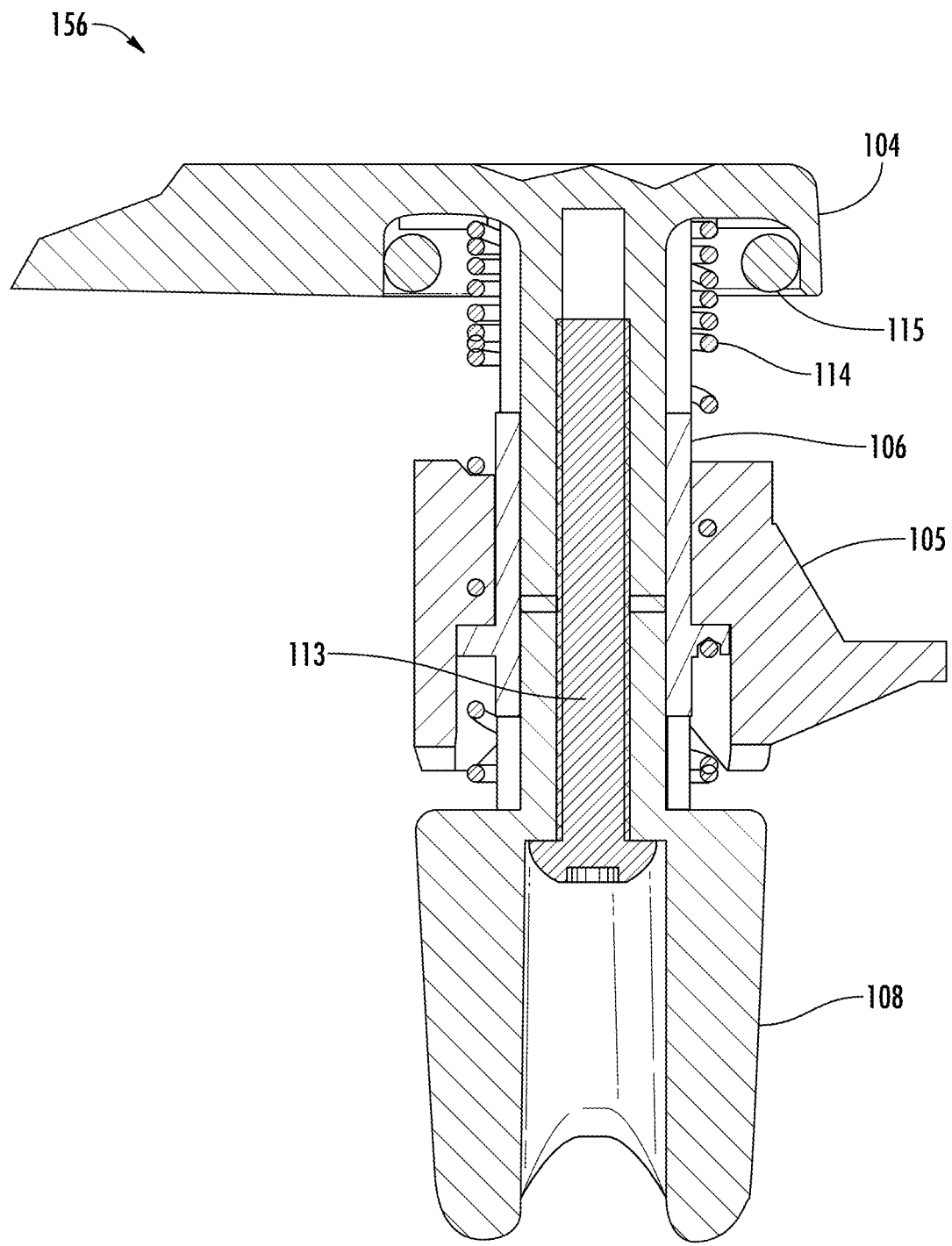
FIG. 7A is an enlarged view of the handle assembly shown in FIG. 6A in accordance with a first embodiment of the present invention.
Figure 7B:
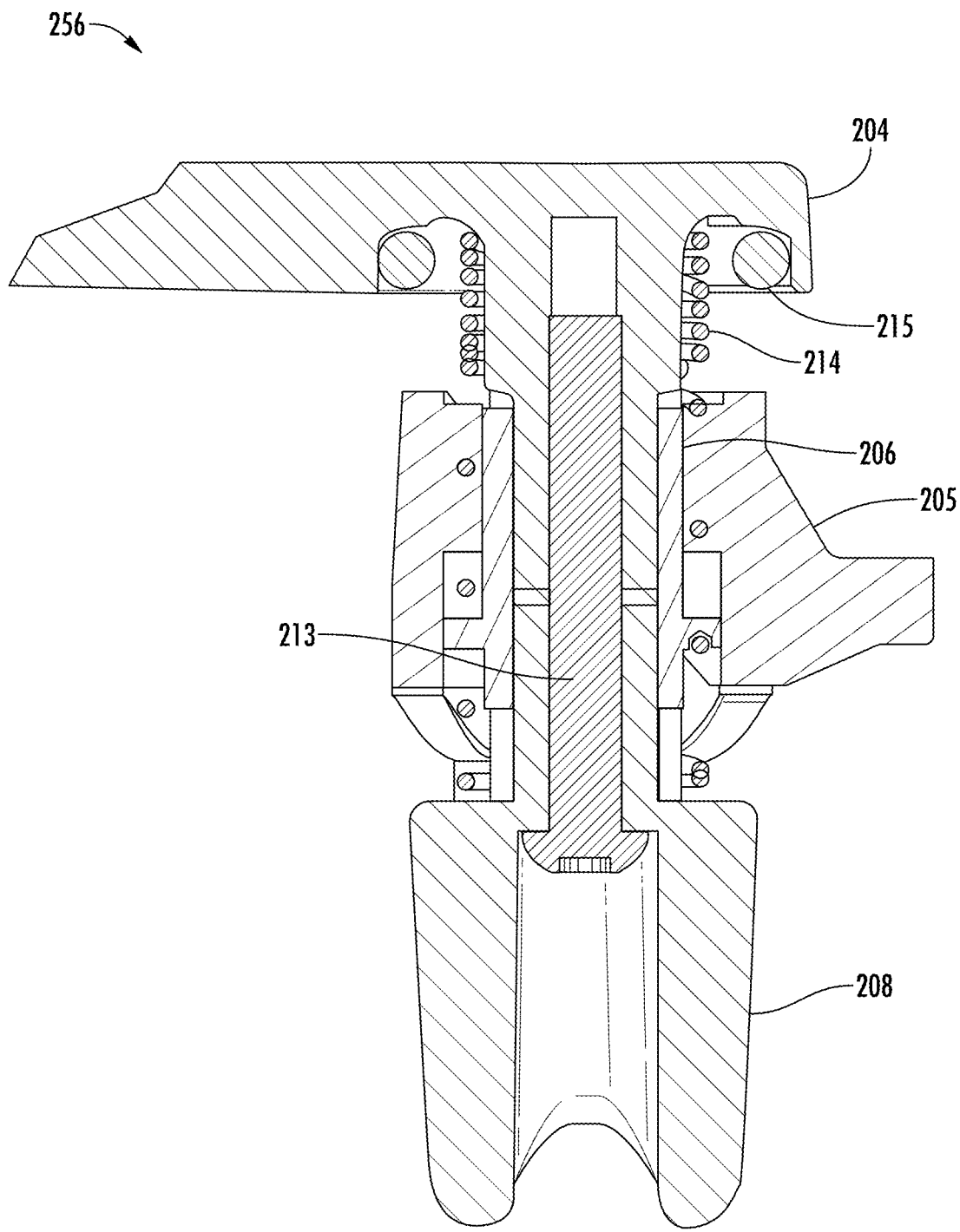
FIG. 7B is an enlarged view of the handle assembly shown in FIG. 6B in accordance with a second embodiment of the present invention.

As shown in FIGS. 7A and 7B, inside release handle 108, 208 and outside release handle 104, 204 may be connected by screw 113, 213. Outside release handle 104, 204 may comprise an o-ring 115, 215 surrounding a spring 114, 214. The spring may surround an insertion portion of outside release handle 104, 204 and/or an insertion portion of the inside release handle 108, 208. A rotating locker/latch 105, 205 may also surround a handle bushing 106, 206.

Figure 8A:
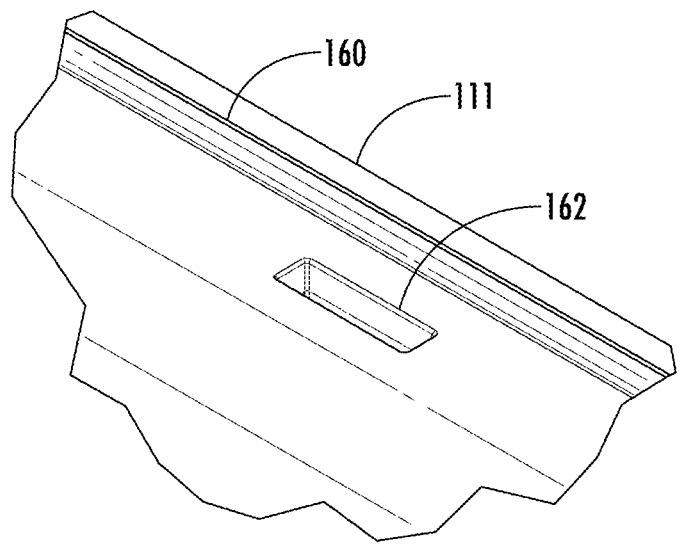
FIG. 8A is a partial view of inner lid snap feature detail of the vehicle hatch of FIG. 1A in accordance with a first embodiment of the present invention.
Figure 8B:
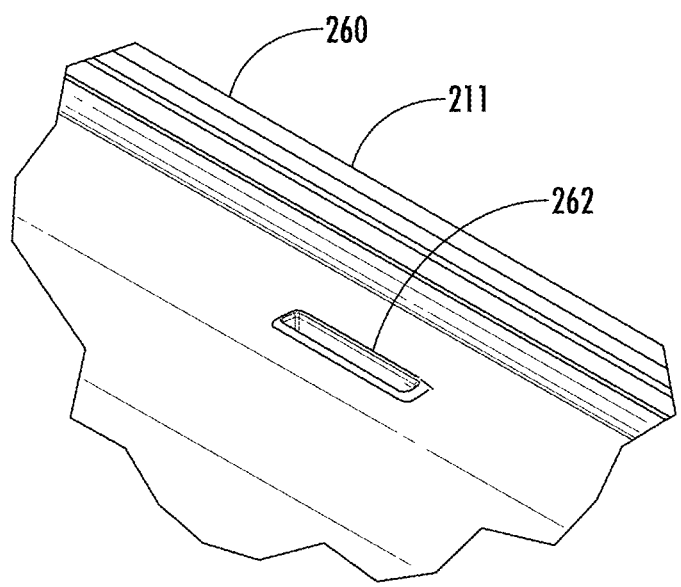
FIG. 8B is a partial view of inner lid snap feature detail of the vehicle hatch of FIG. 1C in accordance with a second embodiment of the present invention.
Figure 8C:
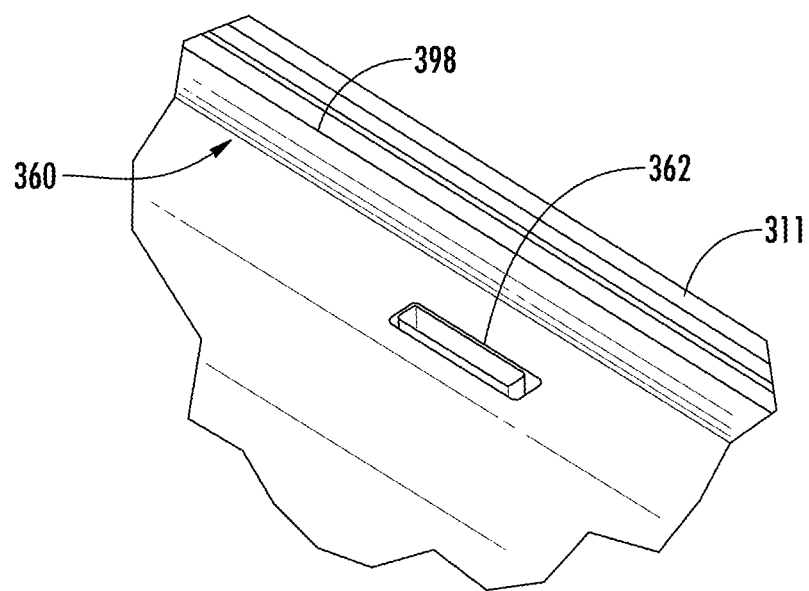
FIG. 8C is a partial view of inner lid snap feature detail of the vehicle hatch of FIG. 4C in accordance with a third embodiment of the present invention.

FIG. 8A is a partial view of the inner lid 111 snap feature detail of the vehicle hatch 100 of the first embodiment illustrated in FIG. 1A. FIG. 8B is a partial view of the inner lid 211 snap feature detail of the vehicle hatch 200 of the second embodiment illustrated in FIG. 1C, and FIG. 8C is a partial view of the inner lid 311 snap feature detail of the vehicle hatch 300 of the third embodiment illustrated in FIG. 4C. A glue trough 160, 260, 360 may be present on the inner lid 111, 211, 311, and glue may be inserted the glue trough. Alternatively, where a caulk like rope 398 is used, the caulk like rope may be received within the glue trough 360 as illustrated in FIG. 8C. A snap feature 162, 262, 362 may hold inner lid 111, 211, 311 and outer lid 118, 218, 318 together during glue cure.

FIG. 9A is an enlarged view of lid edge 154 illustrated in FIG. 6A, and FIG. 9B is an enlarged view of lid edge 254 illustrated in FIG. 6B. FIGS. 9A-9B illustrate an adhesive backed lid seal 164, 264 and inner lid 111, 211 and outer lid 118, 218. The inner and outer lids may be glued and/or fastened together, as described above. A safety switch activation rib 166, 266 may be present within inner lid 111, 211. An alarm switch 127, 227, 327 may be configured to detect when a lid assembly is unlatched based on whether the alarm switch is in contact with the safety switch activation rib 166, 266. However, an alarm switch may be positioned and/or configured to detect that the lid assembly is unlatched in other ways. For example, the alarm switch may be positioned on the link and plunger assembly 134, or the alarm switch may be positioned on the tubular portion of the striker 110. A metal spring 168, 268 may also be provided to activate an alarm when the lid assembly is unlatched. In some embodiments, the hatch may be provided without any alarm switch 127, 227, 327. A sealant 298 or a caulk like rope may be provided between the inner lid 211 and the outer lid 218. A sealant 298 or a caulk like rope may assist in securing the two portions of the lid assembly together.

Figure 10A:
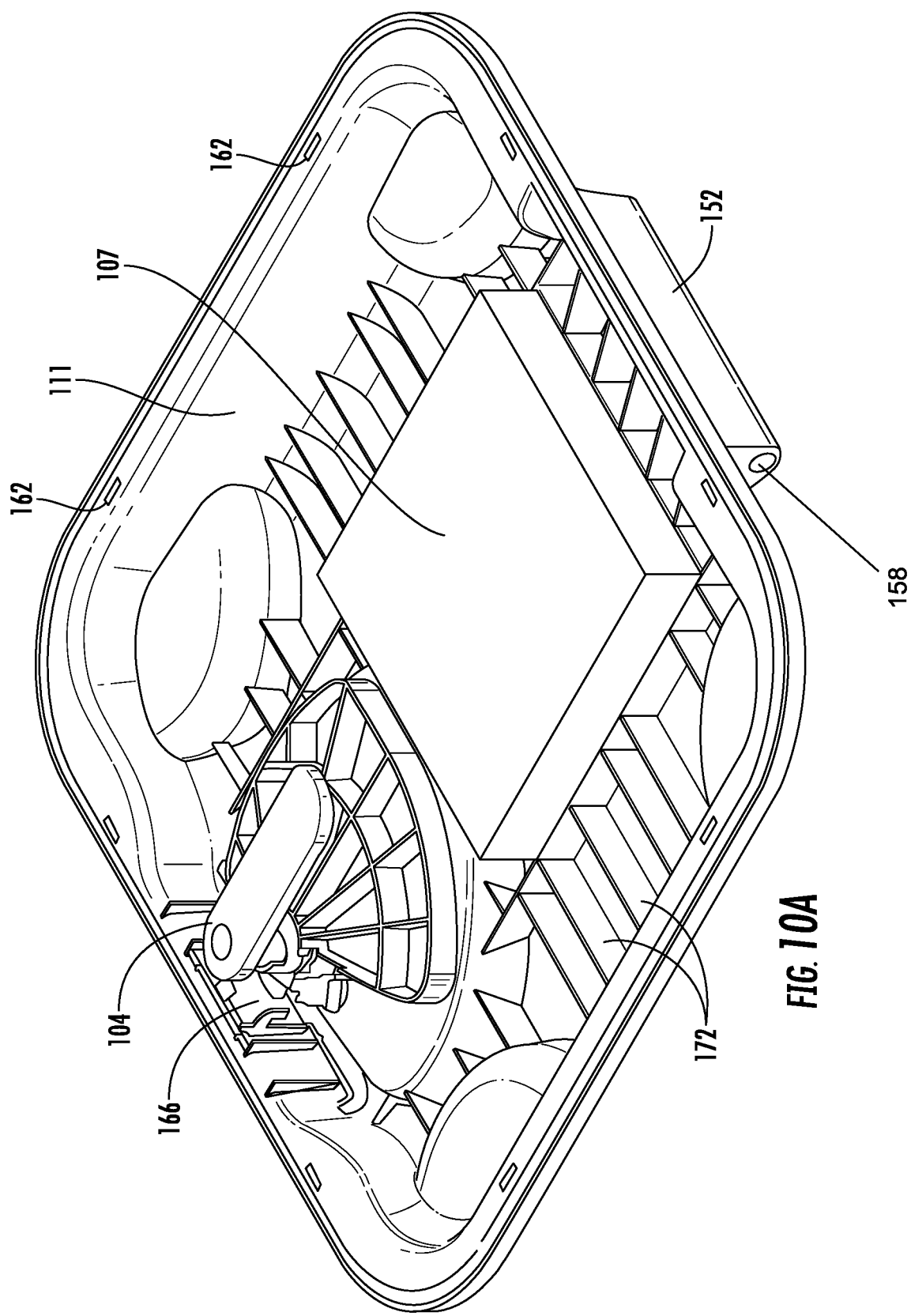
FIG. 10A is an inside view of the lid assembly of the vehicle hatch of FIG. 1A in accordance with a first embodiment of the present invention.
Figure 10B:
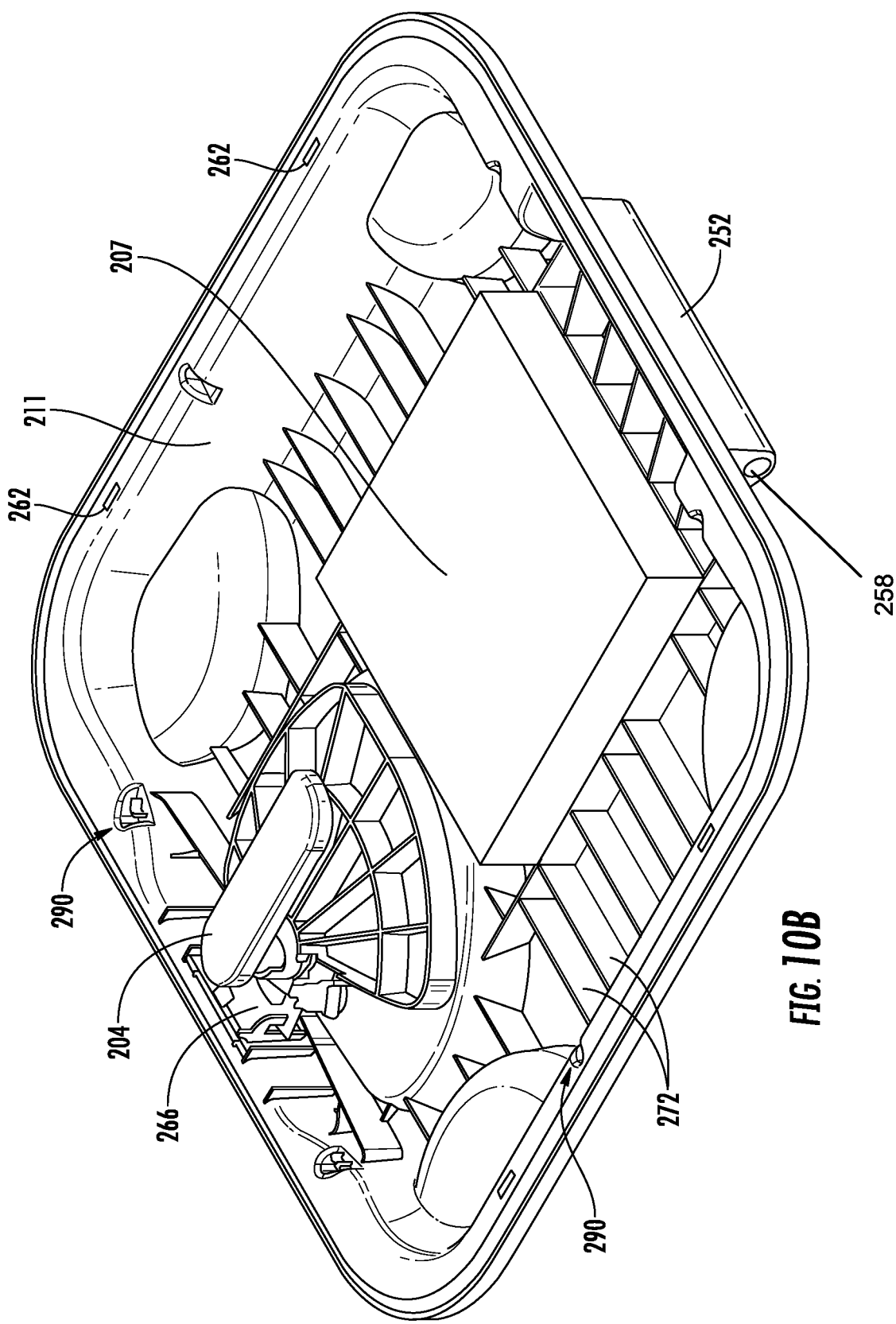
FIG. 10B is an inside view of the lid assembly of the vehicle hatch of FIG. 1C in accordance with a second embodiment of the present invention.
Figure 10C:
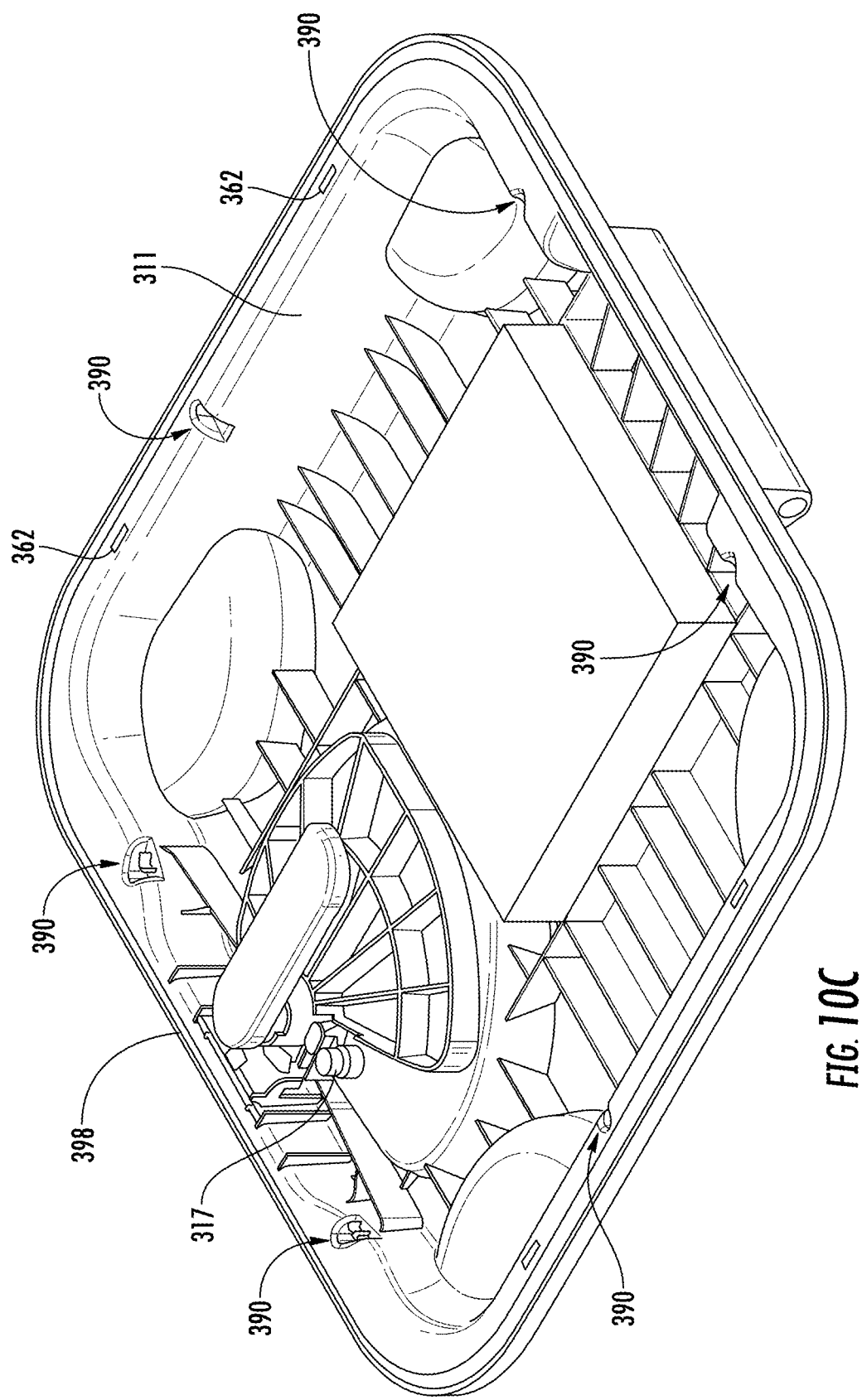
FIG. 10C is an inside view of the lid assembly of the vehicle hatch of FIG. 4C in accordance with a third embodiment of the present invention.

FIG. 10A is an inside view of lid assembly 140 of vehicle hatch 100 in accordance with a first embodiment of the present invention. FIG. 10B is an inside view of lid assembly 240 of vehicle hatch 200 in accordance with a second embodiment of the present invention, and FIG. 10C is an inside view of lid assembly 340 of vehicle hatch 300 in accordance with a third embodiment of the present invention. A cam lock or vandal lock 117, 217, 317 may attach to the inner lid 111, 211, 311—this is shown, for example, in FIG. 10C where vandal lock 317 is attached to inner lid 311. The inner lid may have a one piece design and may include ribs 172, 272 for strength. In some embodiments, the ribs may assist in increasing the strength of the lid assembly while keeping the lid assembly lightweight. As illustrated in FIGS. 10A-10C, snap features 162, 262, 362 may be provided, and embodiments may also comprise one or more screw bosses 290, 390. The caulk-like rope 398 may also be provided around the periphery of the inner lid 311 to secure the inner lid 311 with the outer lid and/or to provide an effective seal.

Figure 11A:
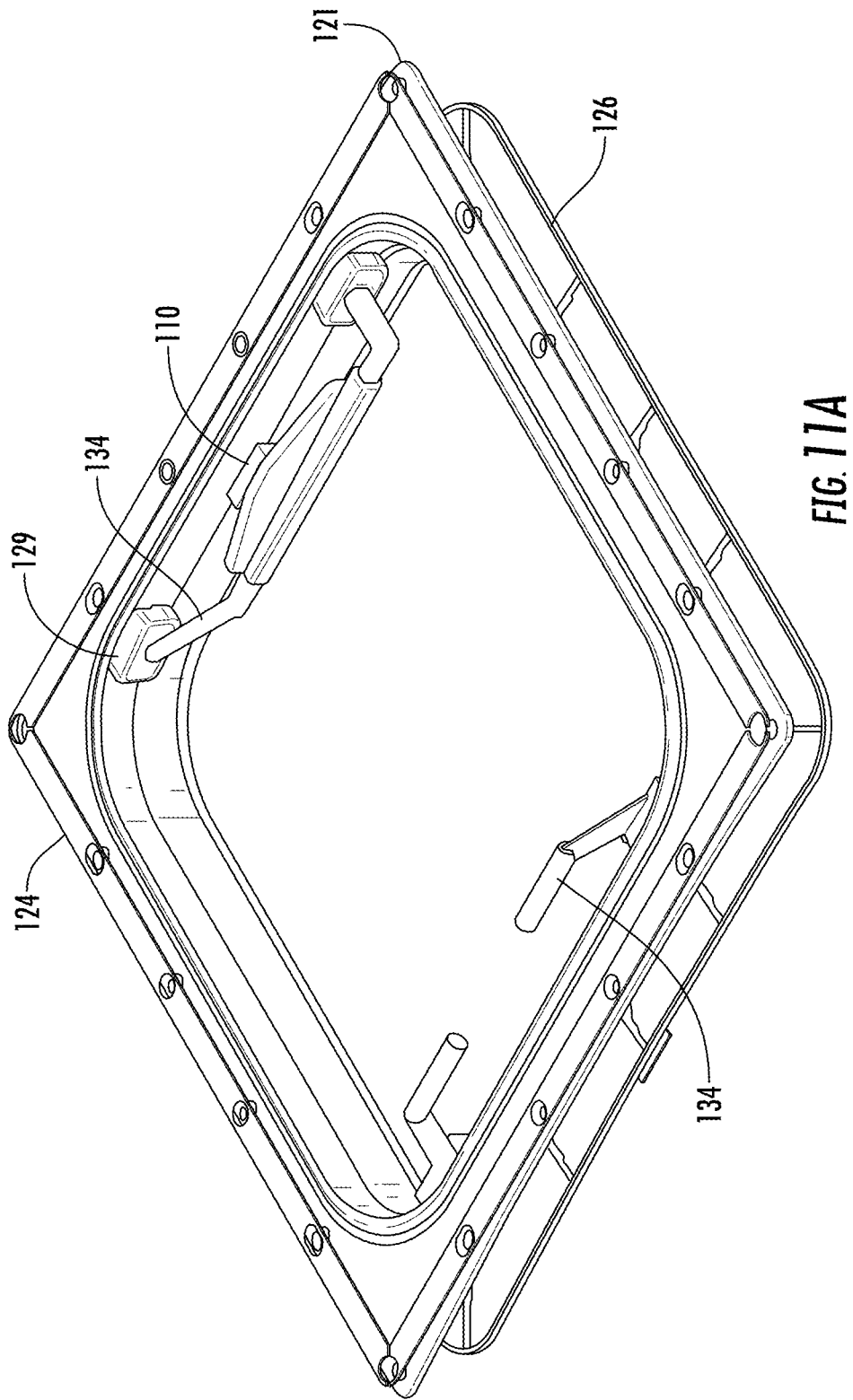
FIG. 11A is an isometric view of the frame assembly of the vehicle hatch of FIG. 1A in accordance with a first embodiment of the present invention.
Figure 11B:
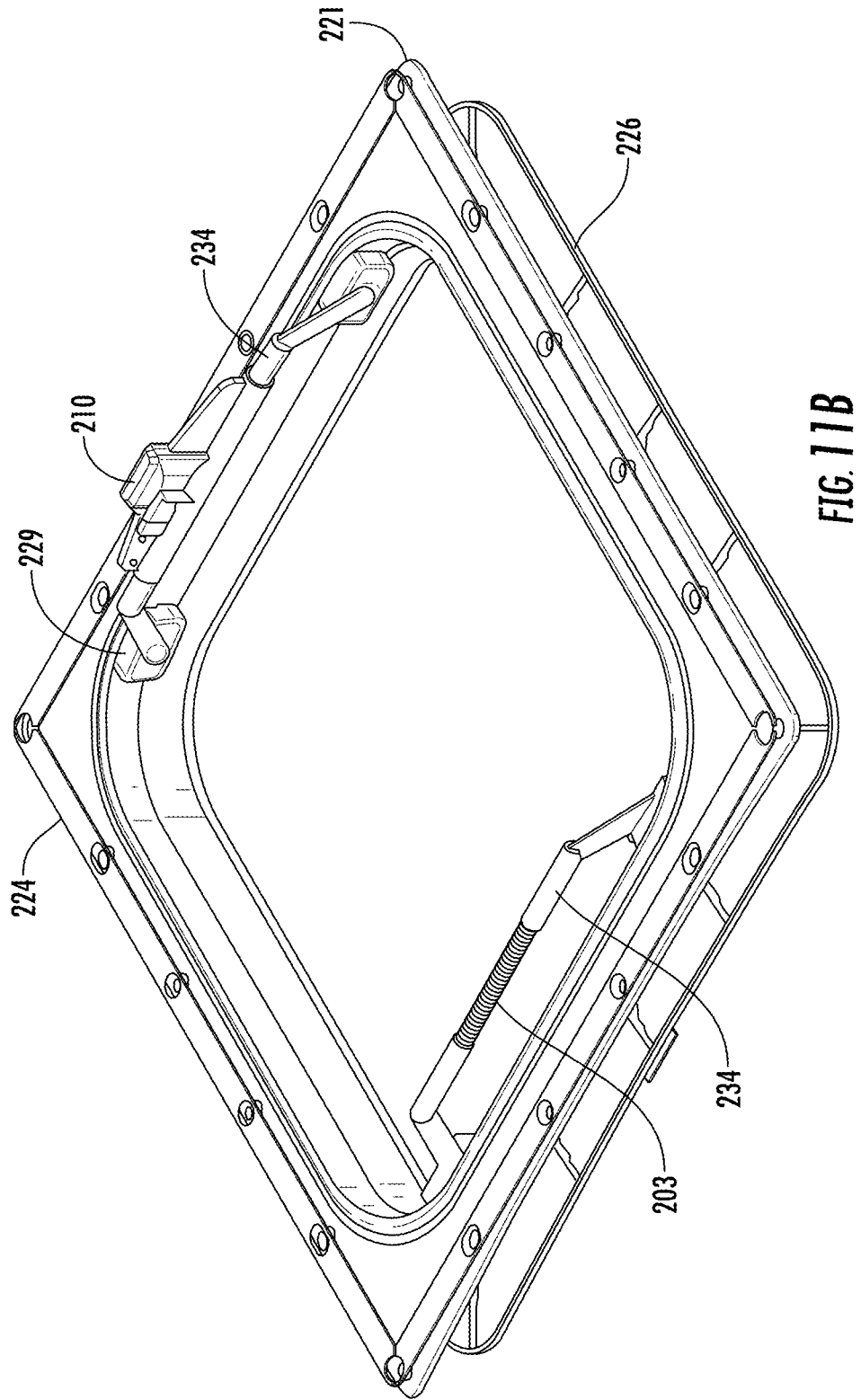
FIG. 11B is an isometric view of the frame assembly of the vehicle hatch of FIG. 1C in accordance with a second embodiment of the present invention.
Figure 12A:
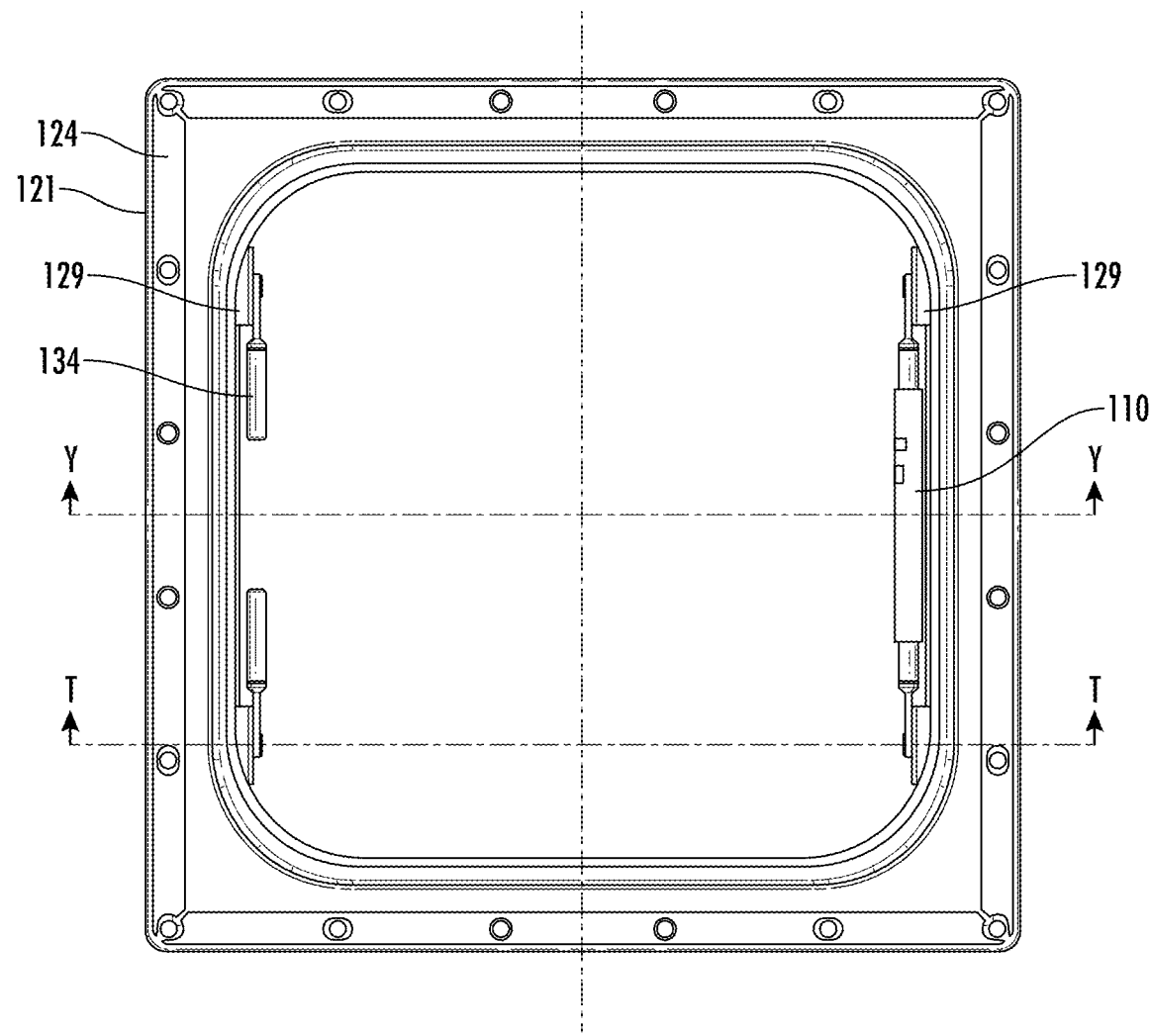
FIG. 12A is a top view of the frame assembly of FIG. 11A in accordance with a first embodiment of the present invention.
Figure 12B:
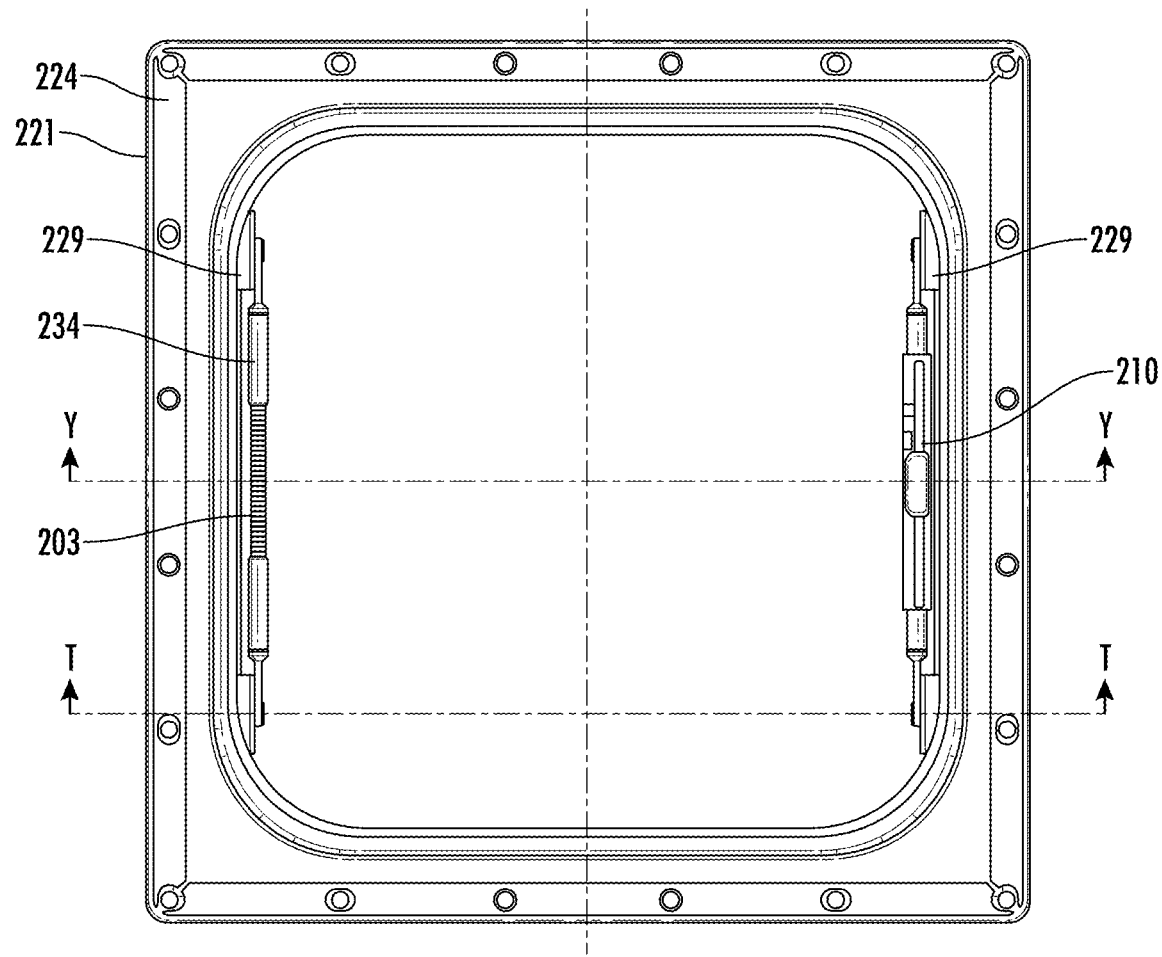
FIG. 12B is a top view of the frame assembly of FIG. 11B in accordance with a second embodiment of the present invention.

FIG. 11A illustrates an isometric view of the frame assembly of vehicle hatch 100 of FIG. 1A in accordance with a first embodiment of the present invention, and FIG. 11B illustrates an isometric view of the frame assembly of vehicle hatch 200 of FIG. 1C in accordance with a second embodiment of the present invention. FIG. 12A illustrates a top view of the frame assembly of FIG. 11A in accordance with a first embodiment of the present invention, and FIG. 12B illustrates a top view of the frame assembly of FIG. 11B in accordance with a second embodiment of the present invention. Within FIGS. 11A, 11B, 12A, and 12B, the striker 110, 210, link and plunger assemblies 134, 234, and covers 129, 229 may be seen. A spring 203 may assist in maintaining tension on lid assembly 240 in the vented and unvented positions.

Figure 13B:
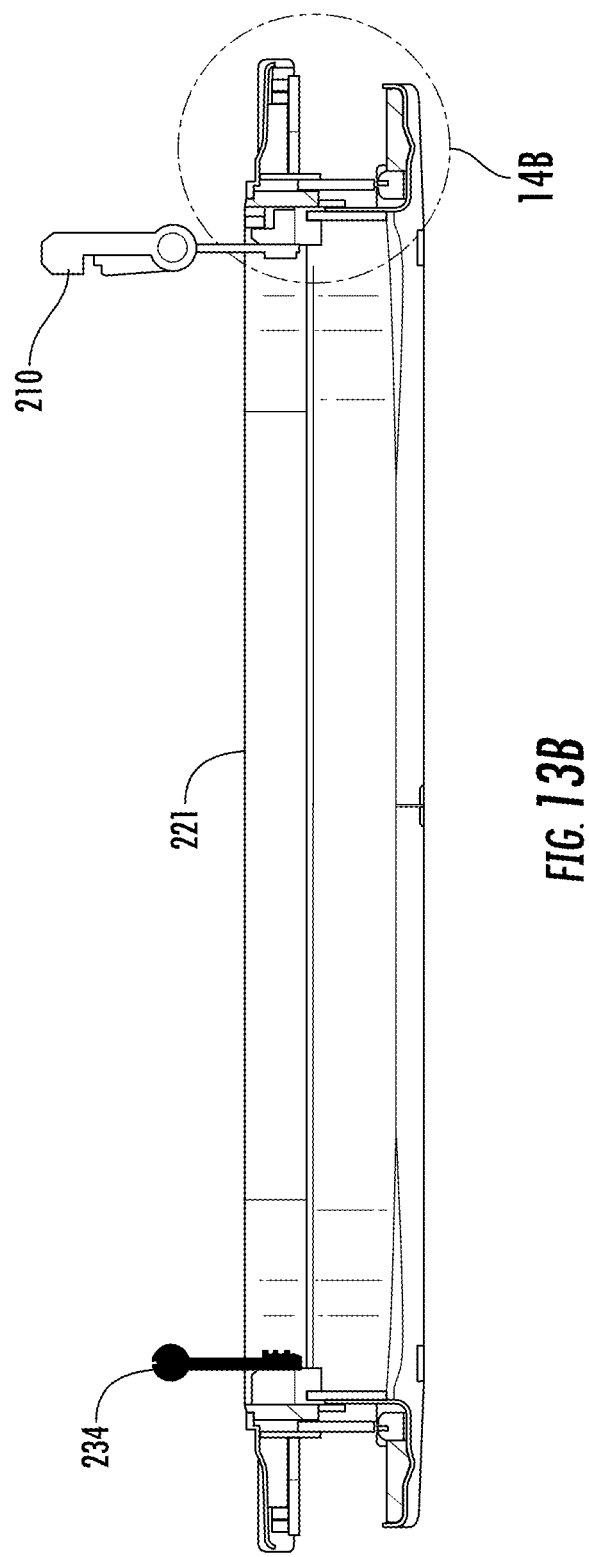
FIG. 13B is a sectional view of Section Y-Y of the frame assembly of FIG. 12B in accordance with a second embodiment of the present invention.
Figure 14A:
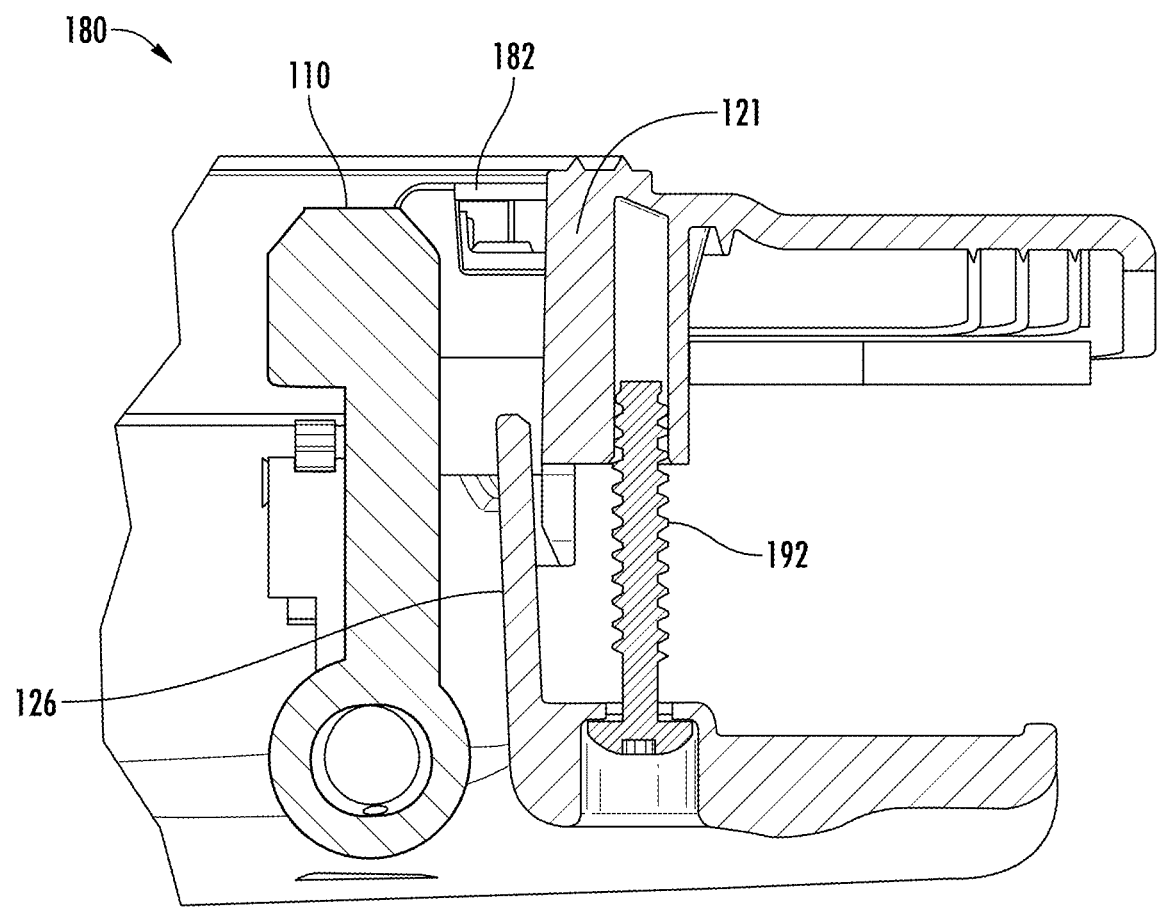
FIG. 14A is an enlarged view of the fastener of FIG. 13A in accordance with a first embodiment of the present invention.
Figure 14B:
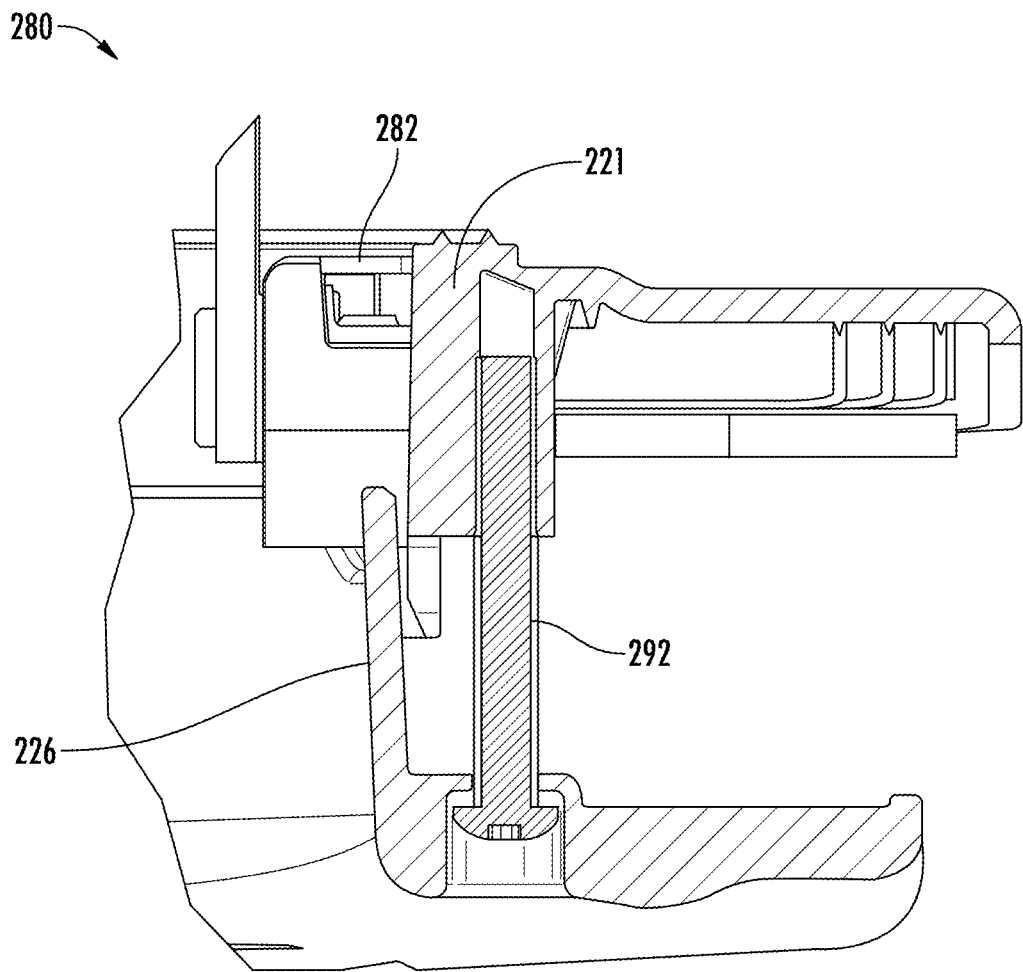
FIG. 14B is an enlarged view of the fastener of FIG. 13B in accordance with a second embodiment of the present invention.

FIG. 13A is a sectional view of Section Y-Y of the frame assembly of FIG. 12A, and FIG. 13B is a sectional view of Section Y-Y of the frame assembly of FIG. 12B. The circled portion of FIGS. 13A and 13B illustrates the location of the fastener assembly 180, 280, with FIG. 14A illustrating an enlarged view of the fastener assembly 180 of FIG. 13A and with FIG. 14B illustrating an enlarged view of the fastener assembly 280 of FIG. 13B. As shown in FIGS. 14A and 14B, one or more notches 182, 282 may be provided in the frame for an alarm switch wire pass-thru. In some embodiments, one notch 182, 282 is provided at the back of the frame for an alarm wire pass-thru, and another notch is provided at the front of the frame for a vandal lock wire pass-thru. The trim ring 126, 226 may nest inside the frame 121, 221 of the frame assembly. One or more screws 192, 292 or other fasteners may be inserted through a recess or a threaded hole in the trim ring 126, 226 and received by the frame 121, 221, securing the hatch to the roof (roof not shown). A screw together trim ring and the frame may be advantageous as they may result in decreased installation time and improved installation consistency. The clamp load provided by screws 192, 292 may result in improved sealing from water leaks, and recessed screws in the trim ring 126, 226 may provide a more streamlined design.

Figure 16A:
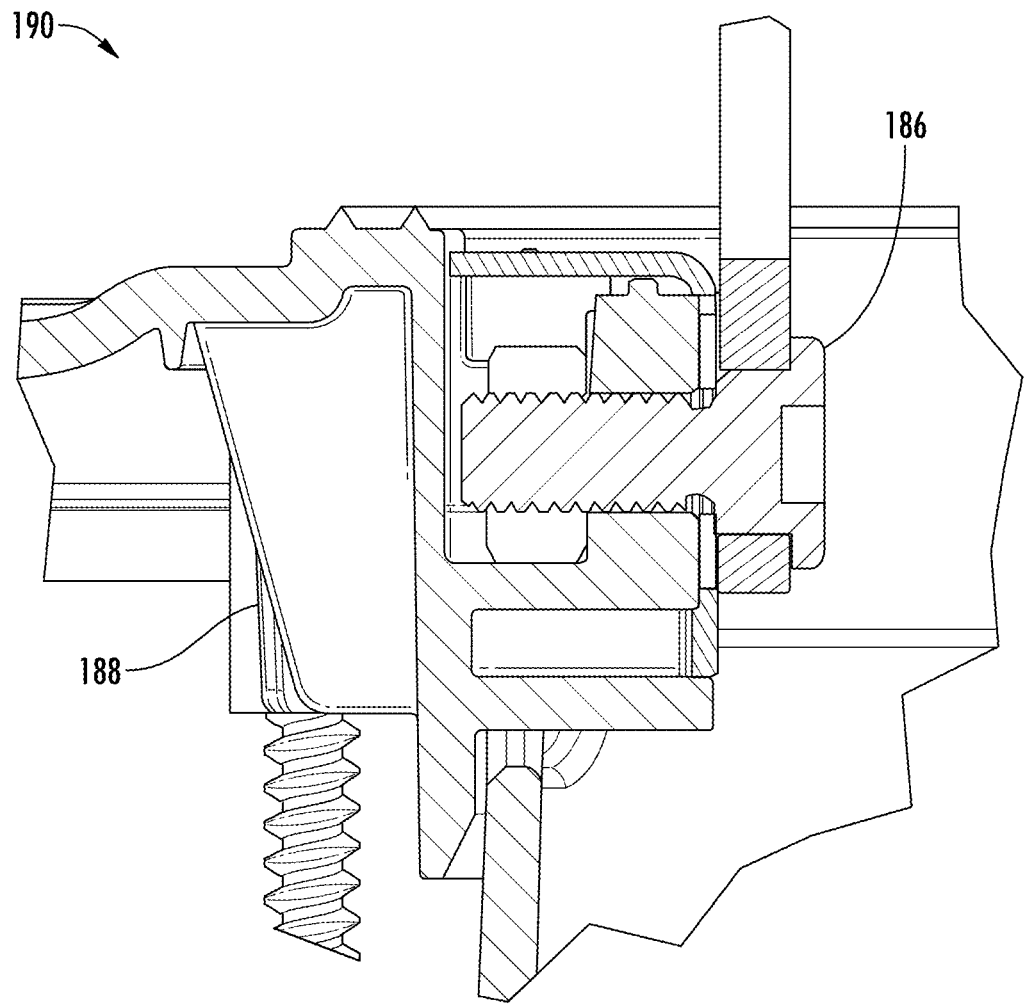
FIG. 16A is an enlarged view of the hinge of FIG. 15A in accordance with a first embodiment of the present invention.
Figure 16B:
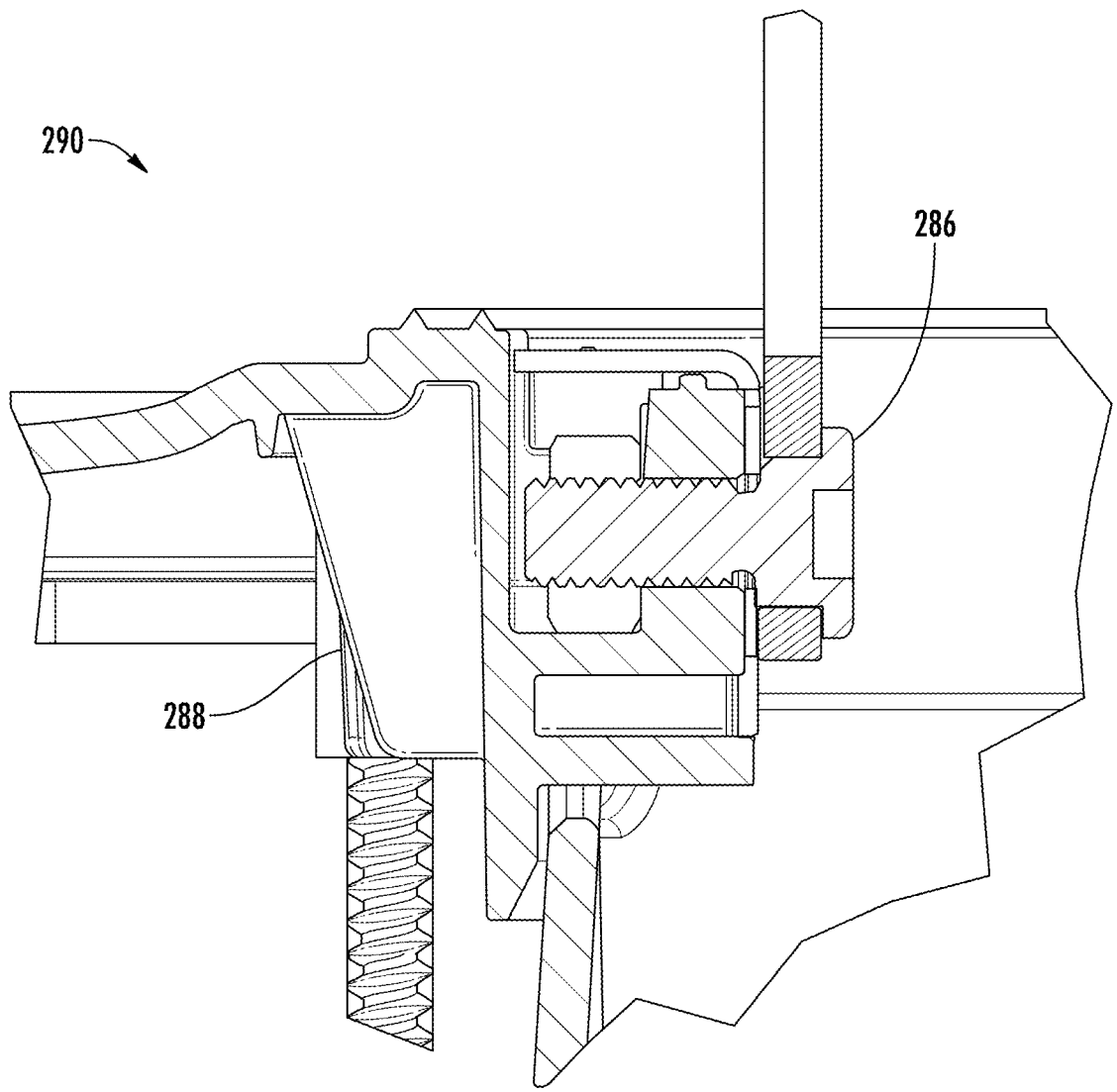
FIG. 16B is an enlarged view of the hinge of FIG. 15B in accordance with a second embodiment of the present invention.

FIG. 15A is a sectional view of Section T-T of the frame assembly of FIG. 12A, and FIG. 15B is a sectional view of Section T-T of the frame assembly of FIG. 12B. In FIGS. 15A and 15B, the location of the hinge assemblies 190, 290 are illustrated. FIG. 16A is an enlarged view of the hinge assembly 190 of FIG. 15A, and FIG. 16B is an enlarged view of the hinge assembly 290 of FIG. 15B. As shown in FIG. 16, a shoulder bolt and locknut 186 attach hinges to frame, and four bolts and four locknuts may be used in some embodiments. Frame gussets 188, 288 may align the hatch to the roof cutout.

Figure 17:
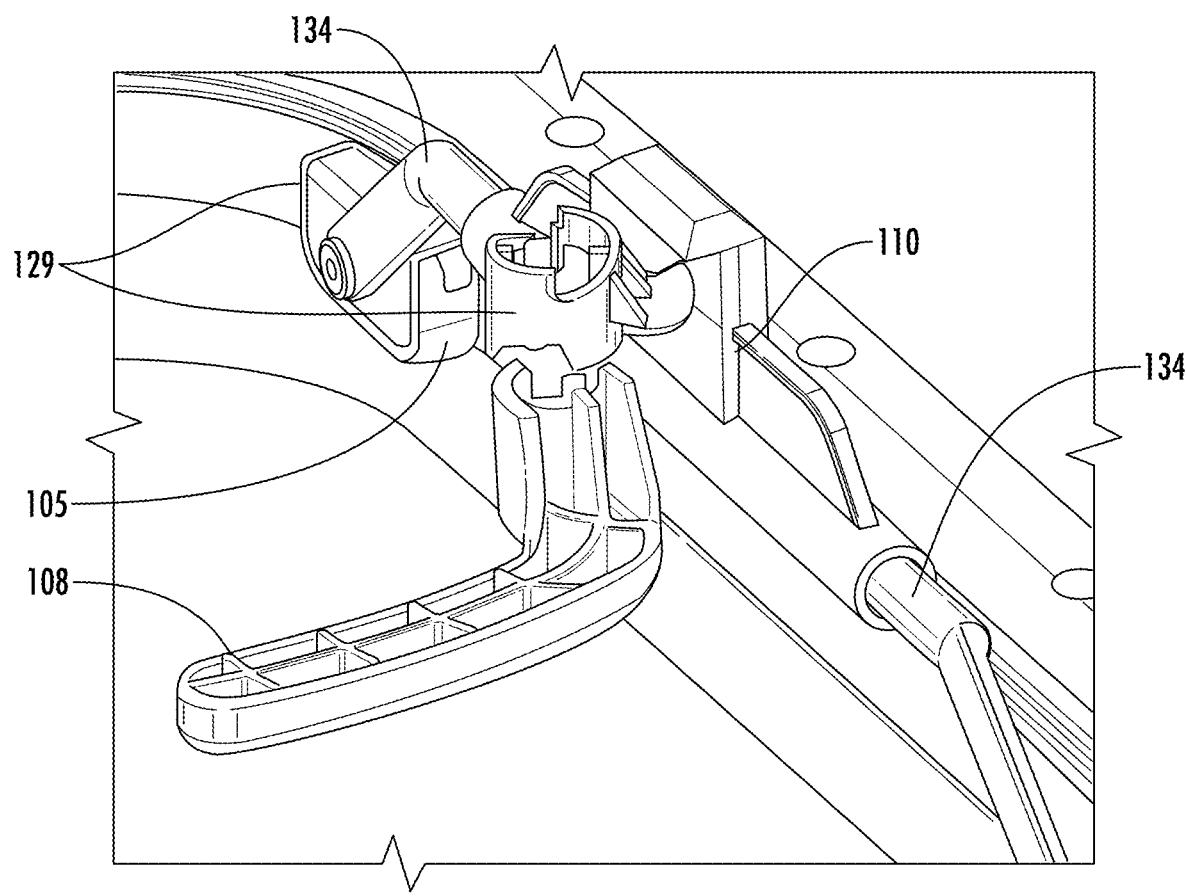
FIG. 17 is an illustrative view of moving parts of the lid of the vehicle hatch with safety vent of FIG. 1A in accordance with a first embodiment of the present invention.

FIG. 17 is an illustrative view of moving parts of the lid of the vehicle hatch 100. A striker 110 may connect the frame to lid assembly 140. A rotating locker 105 may rotate and elevate to contact the striker 110 and hold the lid closed. A handle bushing 106 (FIG. 4A) may connect inside release handle 108 to the rotating locker 105. Inside release handle 108 may be operated by a user to open and close the latch from inside the vehicle, while an outside release handle 104 (FIG. 4A) may open and close the latch from the outside.

Figure 18A:
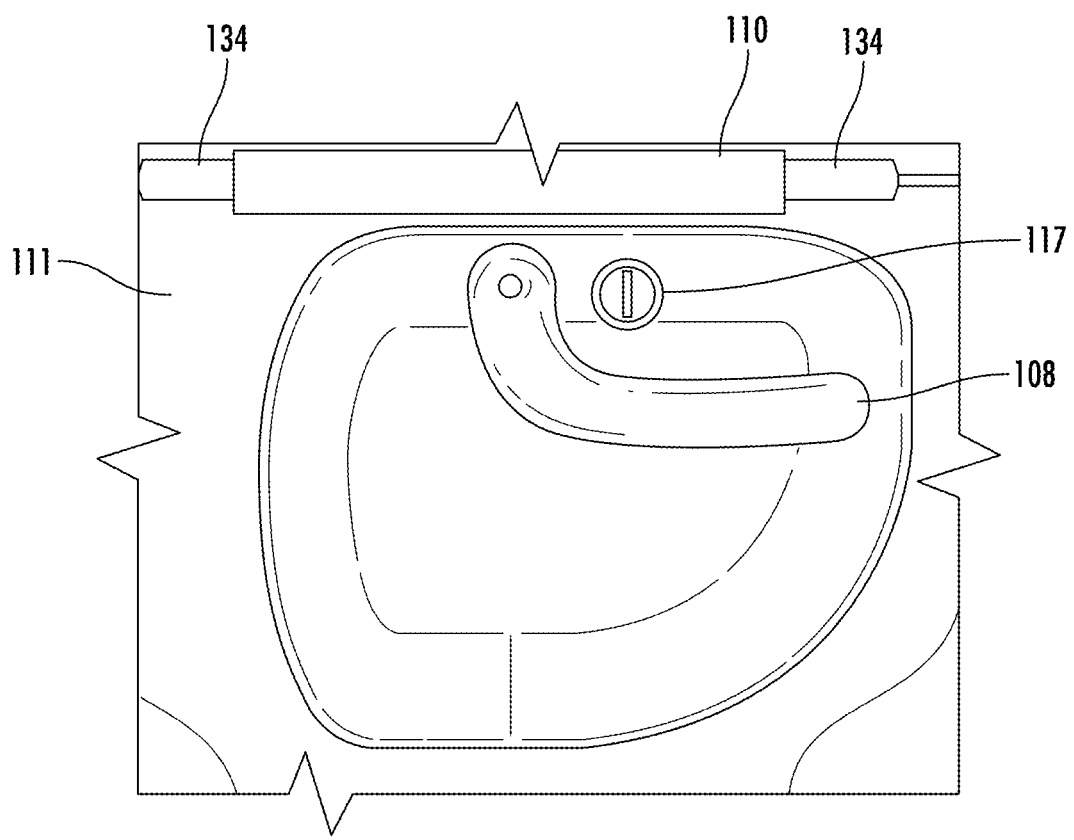
FIG. 18A is an outside view of the vehicle hatch with safety vent of FIG. 1A in an open/unlatched position in accordance with a first embodiment of the present invention.
Figure 18B:
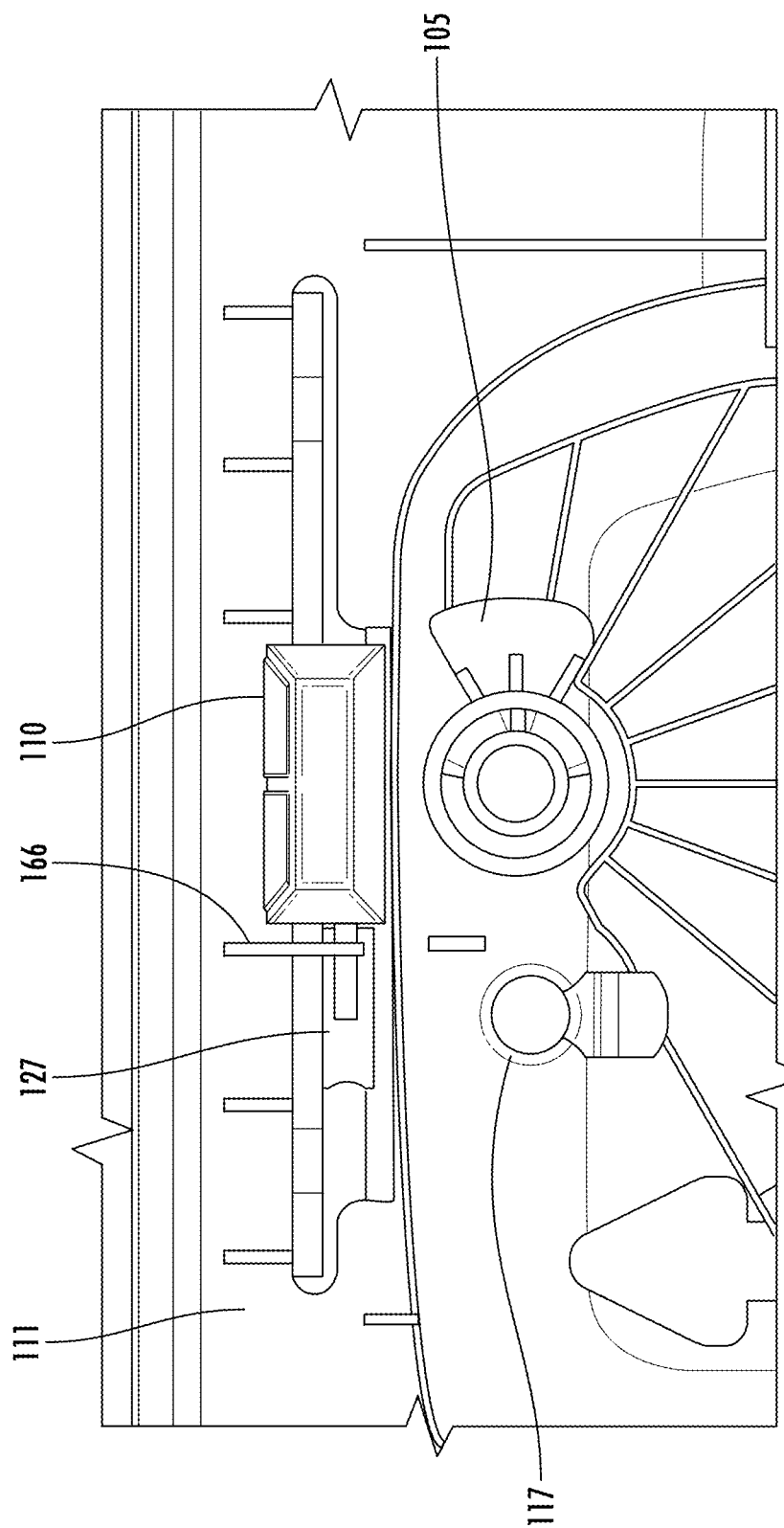
FIG. 18B is an inside view of the vehicle hatch with safety vent of FIG. 1A in an open/unlatched position in accordance with a first embodiment of the present invention.
Figure 18C:
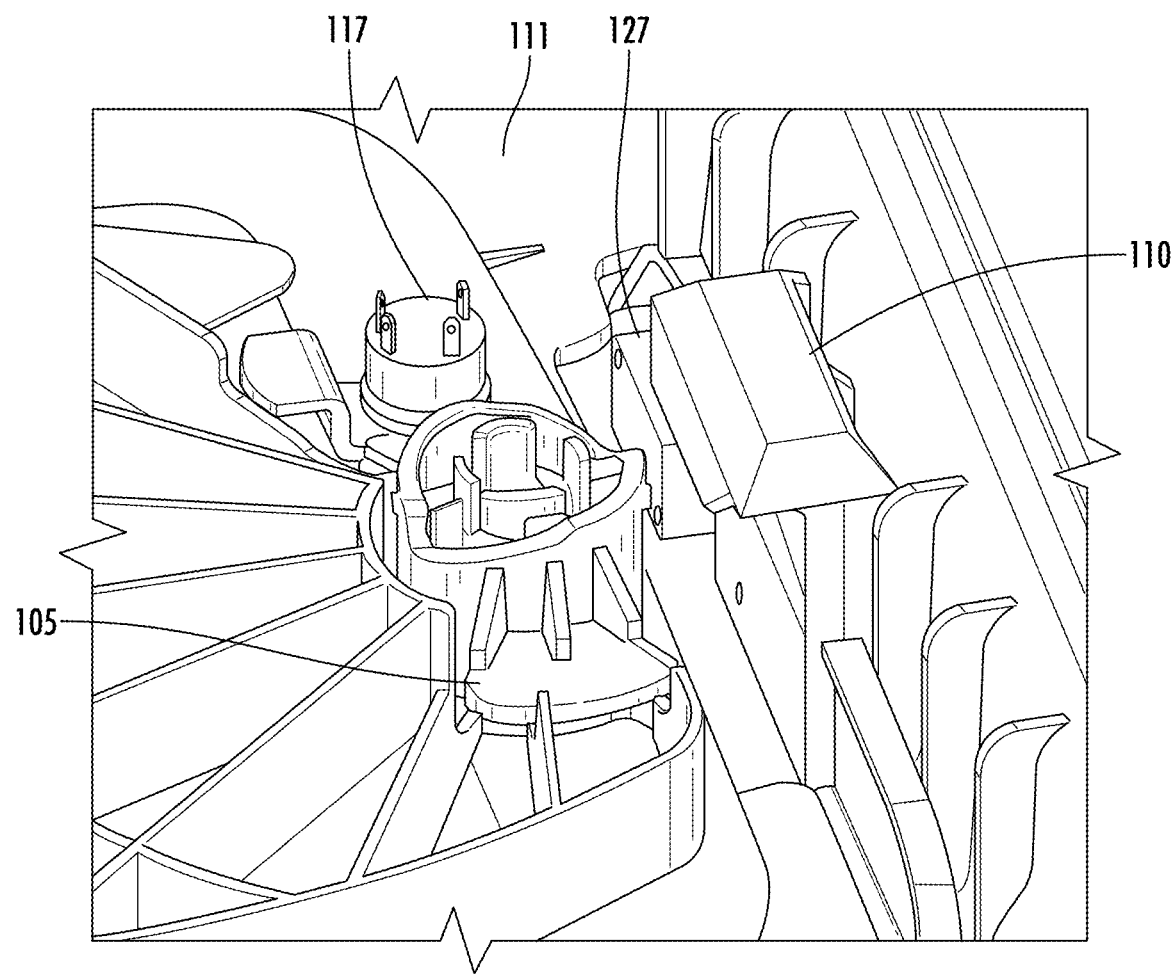
FIG. 18C is a perspective, inside view of the vehicle hatch with safety vent of FIG. 1A in an open/unlatched position in accordance with a first embodiment of the present invention.

FIGS. 18A-18C are illustrative views of the vehicle hatch 100 of FIG. 1A in an open position, with FIG. 18A being is an outside view, FIG. 18B being an inside view, and FIG. 18C being a perspective, inside view. Looking at FIGS. 18B and 18C specifically, rotating locker 105 is completely out of the way of the striker 110 in this position, allowing lid assembly 140 to be opened. Thus, there is no contact surface of the striker 110 contacting the rotating locker 105 to prevent the lid assembly 140 from being opened. Further, a cam lock or a vandal lock 117 may lock the lid assembly 140, preventing the lid assembly from being opened.

Figure 19A:
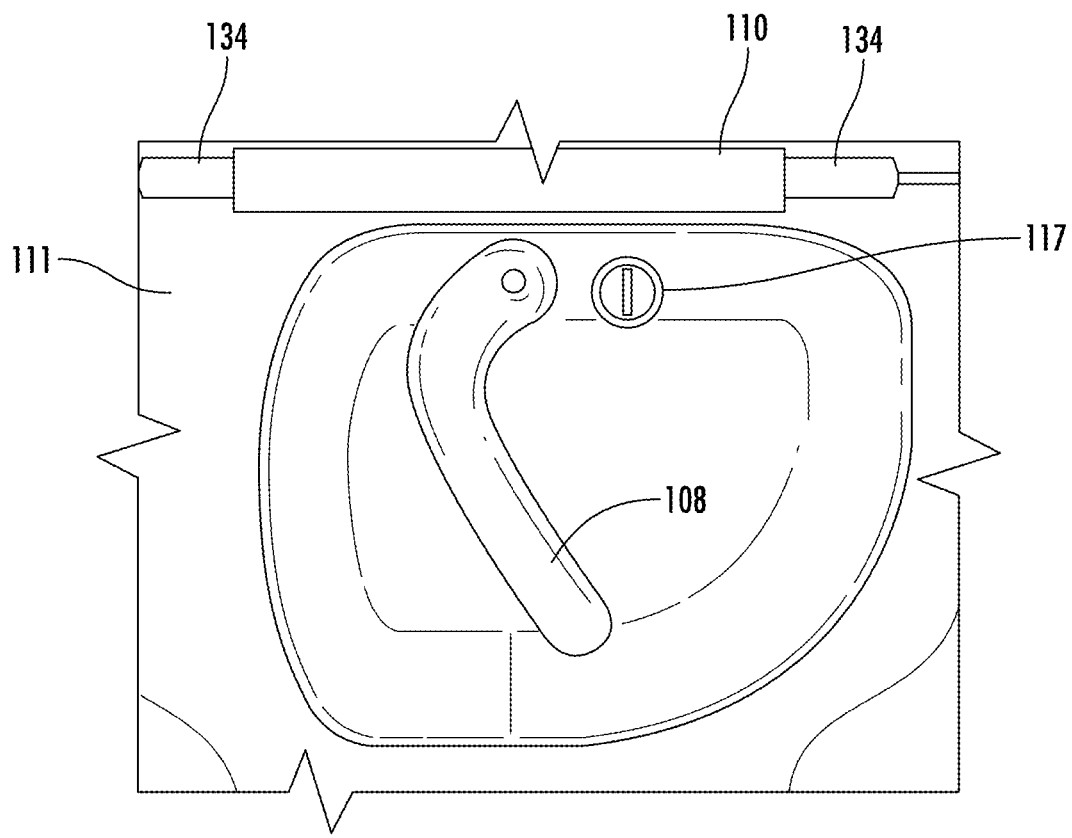
FIG. 19A is an outside view of the vehicle hatch with safety vent of FIG. 1A in a half-latched position in accordance with a first embodiment of the present invention.
Figure 19B:
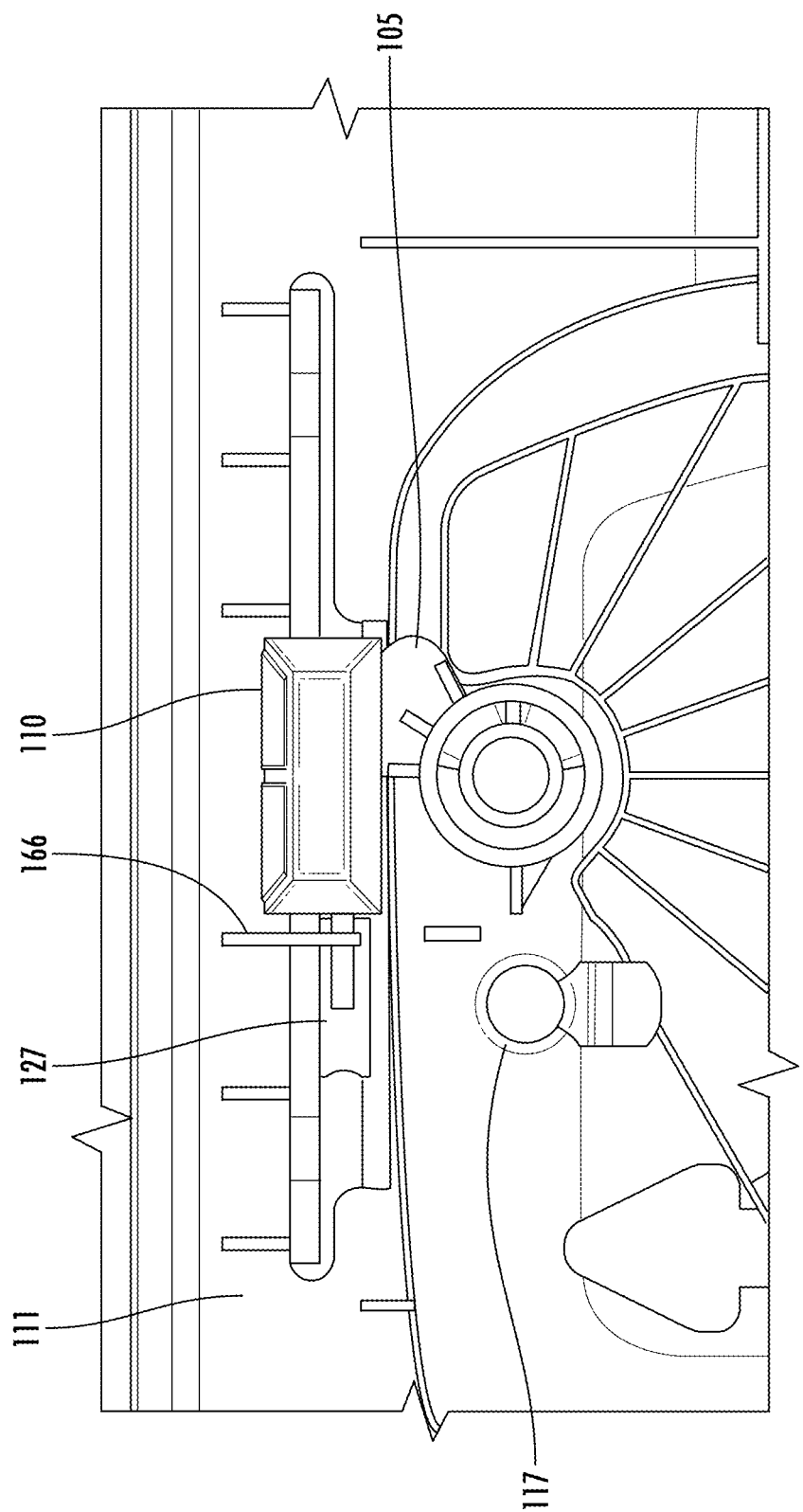
FIG. 19B is an inside view of the vehicle hatch with safety vent of FIG. 1A in a half-latched position in accordance with a first embodiment of the present invention.
Figure 19C:
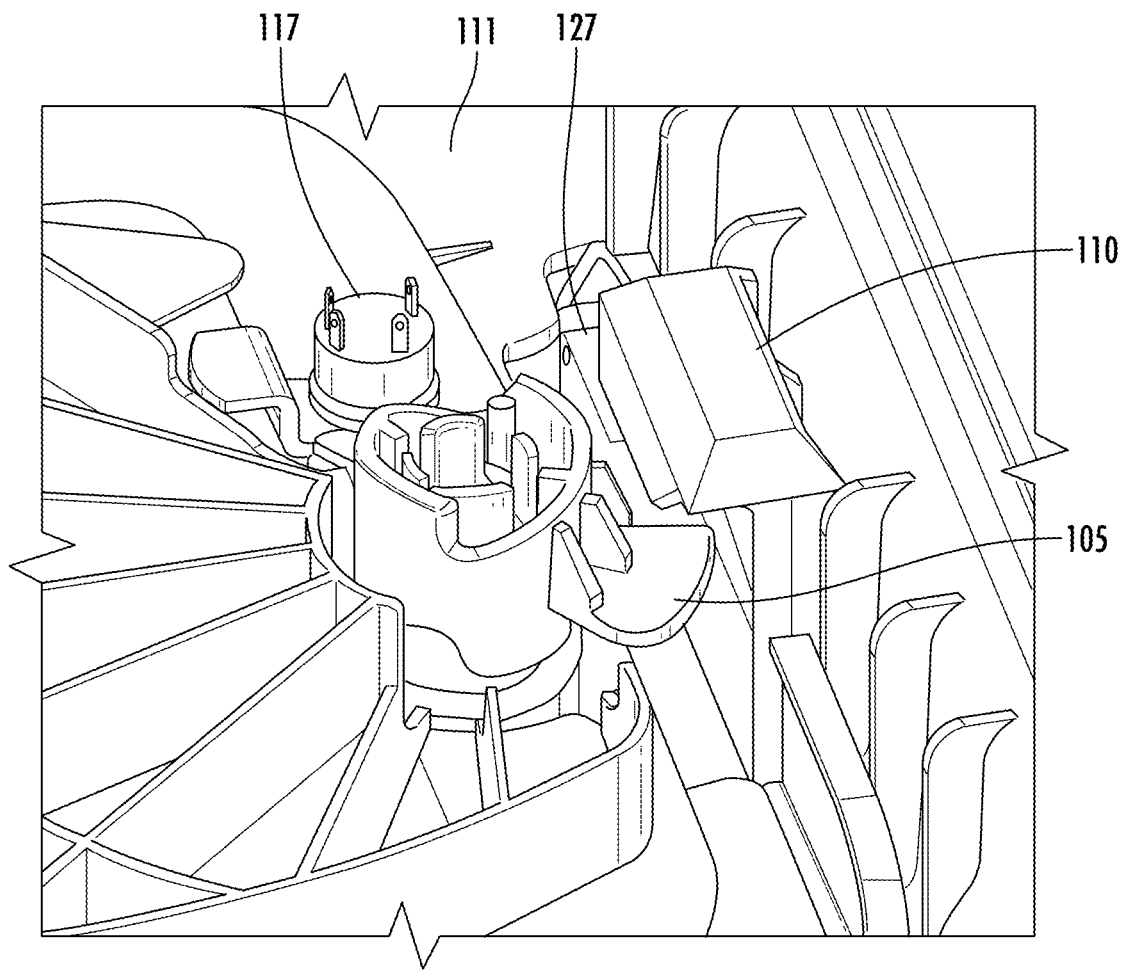
FIG. 19C is a perspective, inside view of the vehicle hatch with safety vent of FIG. 1A in a half-latched position in accordance with a first embodiment of the present invention.

FIGS. 19A-19C are illustrative views of the vehicle hatch 100 of FIG. 1A in a half-latched position, with FIG. 19A being is an outside view, FIG. 19B being an inside view, and FIG. 19C being a perspective, inside view. Looking at FIG. 19B specifically, as the inside release handle 108 is turned, the rotating locker 105 rotates under the striker 110 and begins to travel up (into the page) to pull lid against the striker. Rotating locker 105 may comprise one or more inclined surfaces that are configured to be in contact with the striker 110, and the one or more inclined surfaces may assist in causing the lid to be secured upon rotation of the outside release handle 104 or the inside release handle 108. Here, a contact surface of the striker 110 is contacting the rotating locker 105 to prevent the lid assembly 140 from being opened.

Figure 20A:
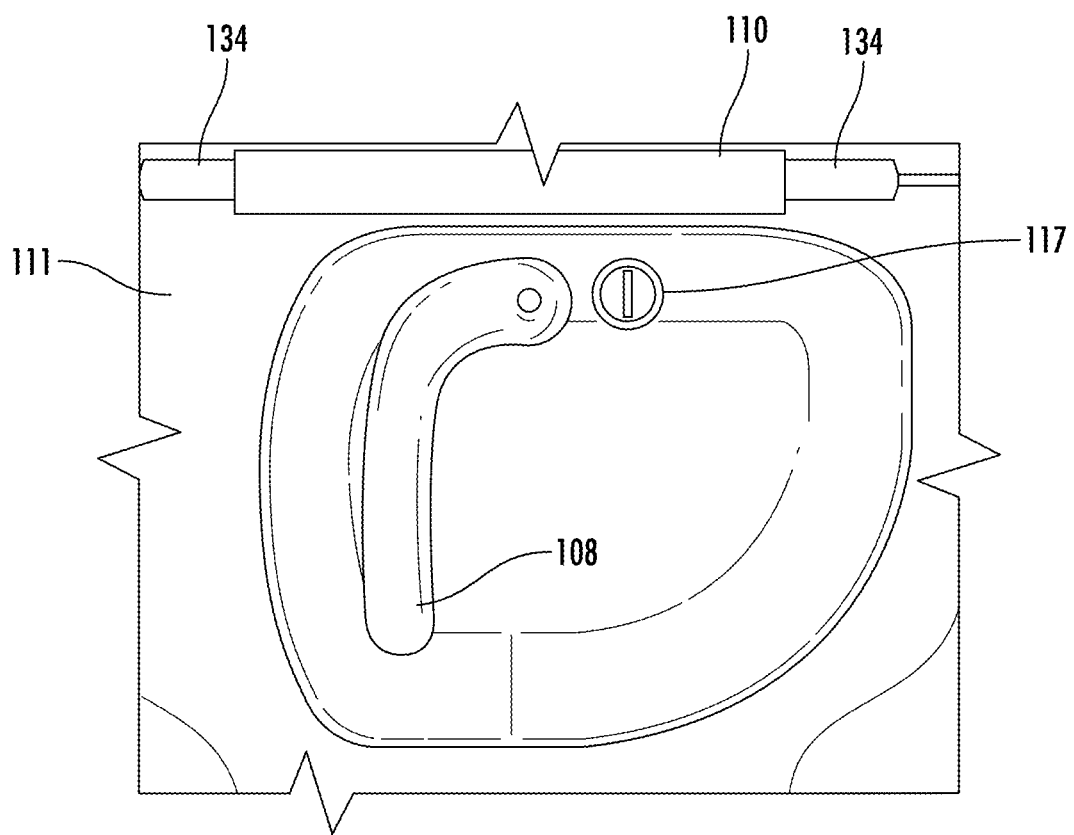
FIG. 20A is an outside view of the vehicle hatch with safety vent of FIG. 1A in a fully latched position in accordance with a first embodiment of the present invention.
Figure 20B:
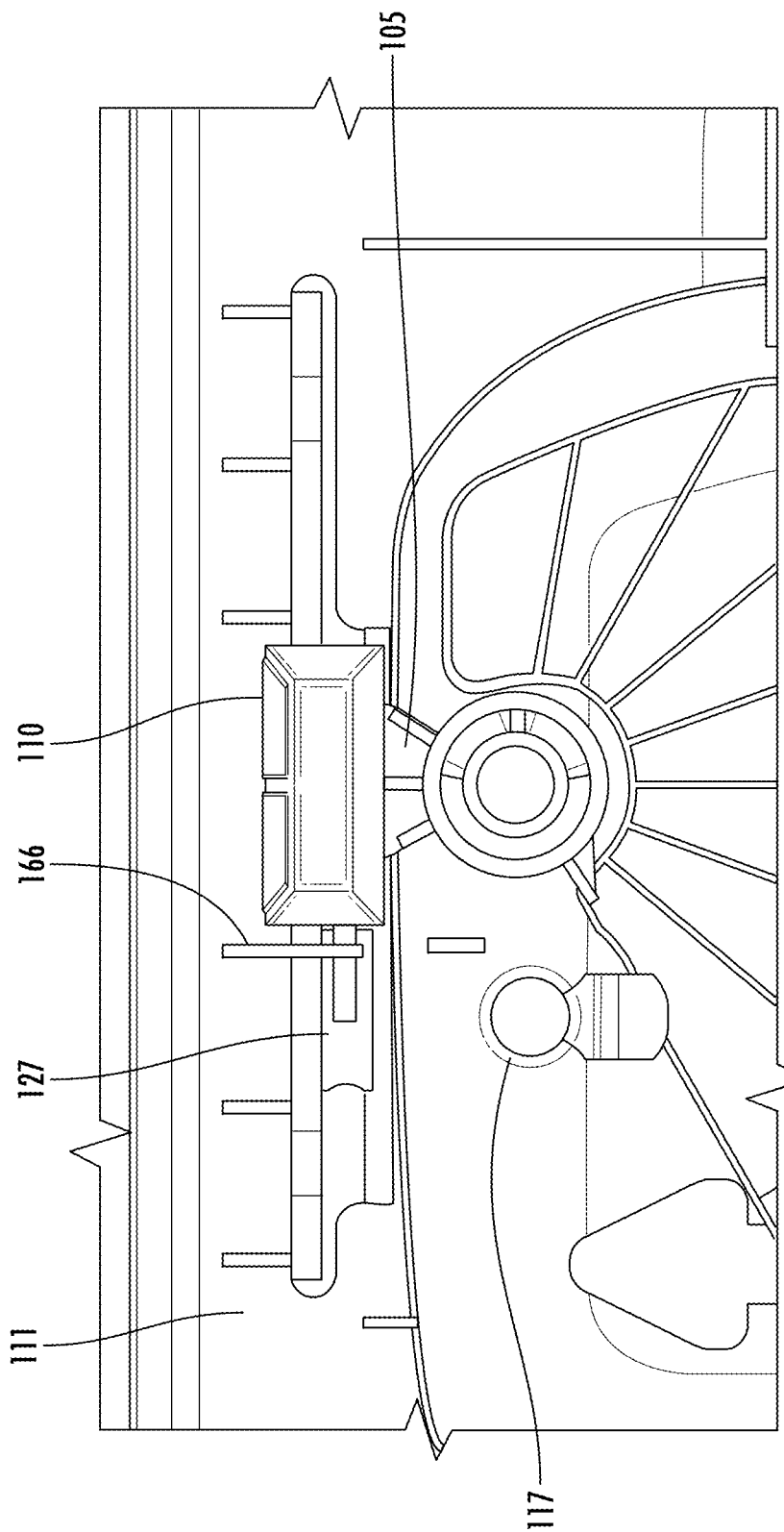
FIG. 20B is an inside view of the vehicle hatch with safety vent of FIG. 1A in a fully latched position in accordance with a first embodiment of the present invention.
Figure 20C:
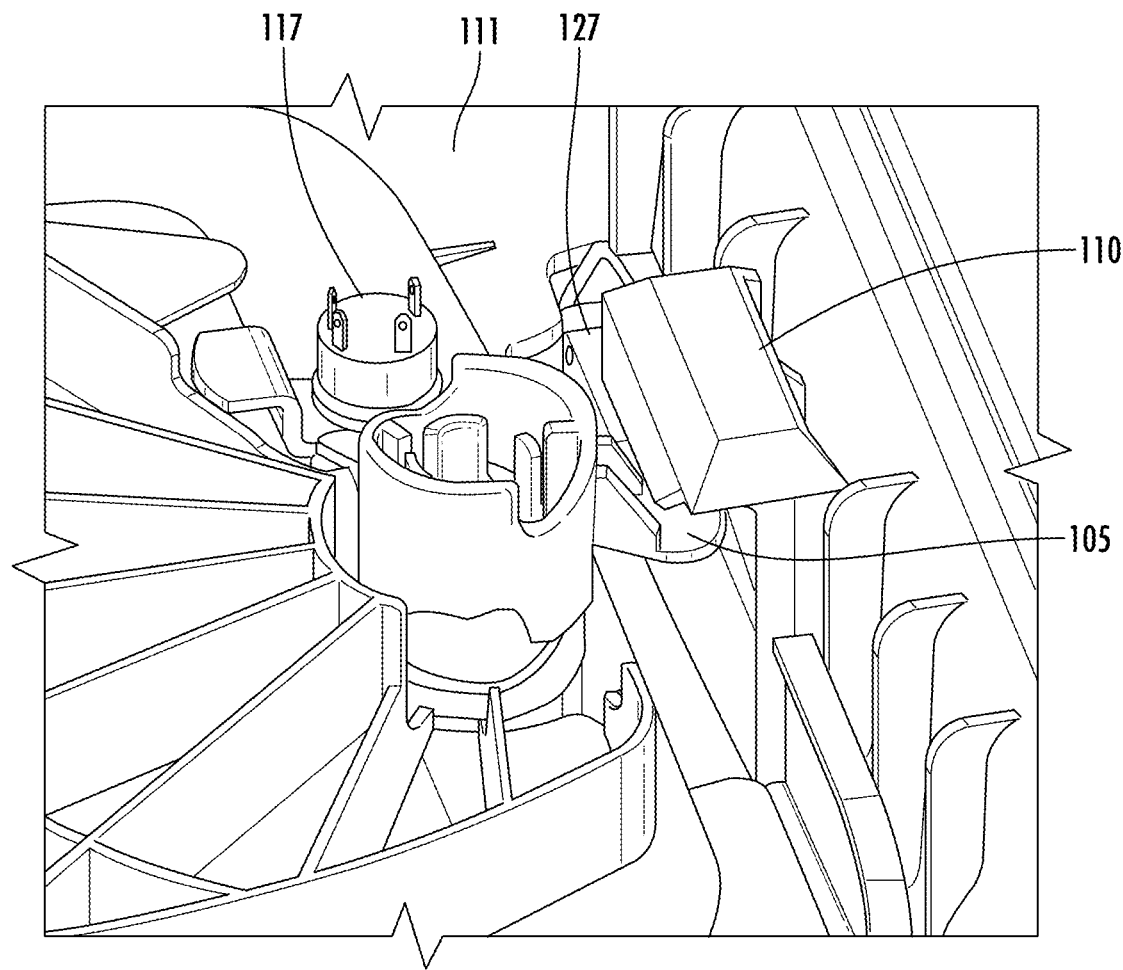
FIG. 20C is a perspective, inside view of the vehicle hatch with safety vent of FIG. 1A in a fully latched position in accordance with a first embodiment of the present invention.

FIG. 20A-20C are illustrative views of the vehicle hatch of FIG. 1A in a fully latched position, with FIG. 20A being is an outside view, FIG. 20B being an inside view, and FIG. 20C being a perspective, inside view. In the fully latched position, the contact surface of the rotating locker 105 is completely under the striker 110, and the lid cannot open. Thus, a contact surface of the striker 110 is contacting the rotating locker 105 to prevent the lid assembly 140 from being opened.

Figure 21:
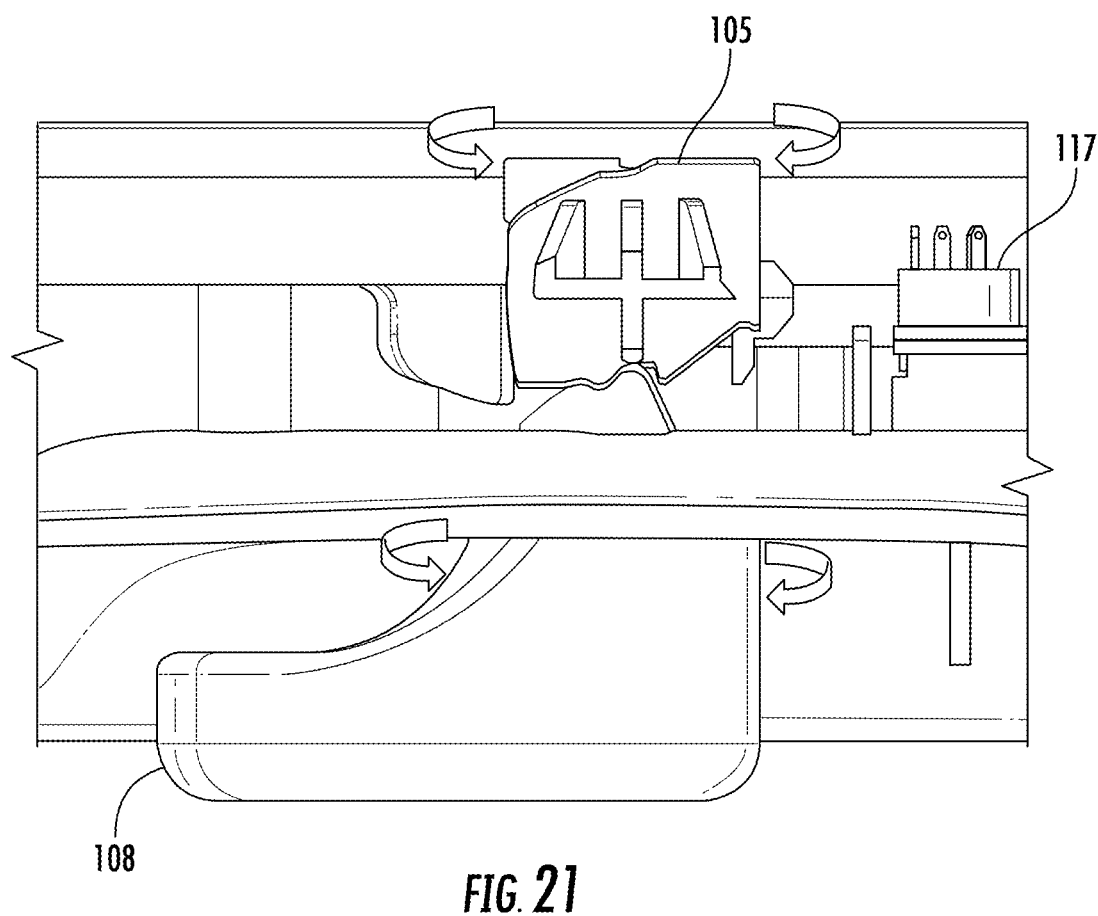
FIG. 21 is an illustrative view of operation of parts of the vehicle hatch with safety vent of FIG. 1A in a latched position in accordance with a first embodiment of the present invention.

FIG. 21 is an illustrative view, which illustrates the operation of the vehicle hatch of FIG. 1A. Inside release handle 108 may be turned by the user, causing the rotating locker 105 connected to the inside release handle 108 to rotate. Then, the rotating locker 105 may contact a ramp molded into the lid. In some embodiments, a metal bearing may be present between the rotating locker 105 and the ramp molded into the lid. This may advantageously reduce wear on the rotating locker 105 and/or the ramp molded into the lid. By rotating the rotating locker 105, contact with the ramp may move rotating locker 105 up to pull lid assembly 140 closed, or the ramp may move down to release lid assembly. Rotation of the inside release handle 108 may cause rotation of the outside release handle 104 and vice versa.

Figure 22A:
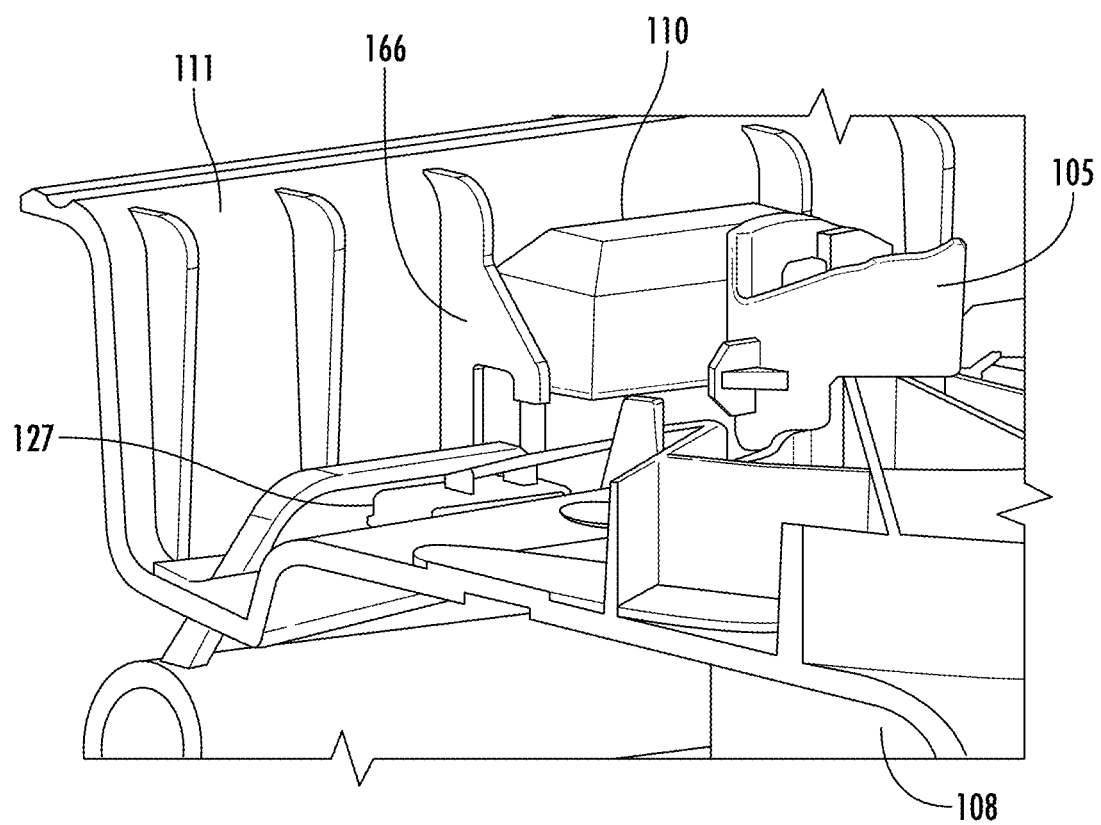
FIGS. 22A and 22B are illustrative views of safety switch activation in the vehicle hatch with safety vent of FIG. 1A in accordance with a first embodiment of the present invention.
Figure 22B:
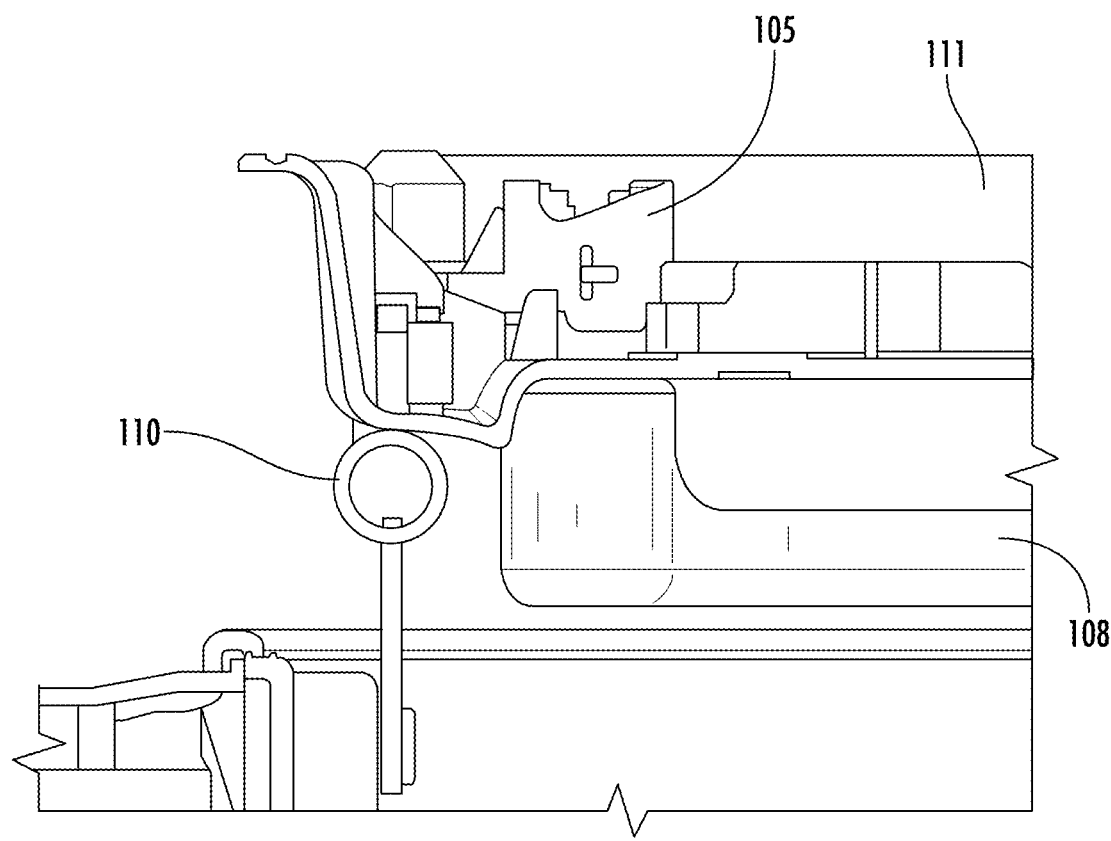

FIGS. 22A and 22B are illustrative views of the vehicle hatch 100 of FIG. 1A, which allows safety switch activation to be seen. A safety switch activation rib 166 may be molded into the inner lid 111 and may be configured to contact the alarm switch 127 when the lid is in a closed position. When the lid is in other positions, the alarm switch 127 and other components may be configured so that the alarm switch 127 generally will not come into contact with the safety switch activation rib 166. However, other alternative approaches may be taken for the alarm switch 127. For example, the alarm switch may be positioned on the link and plunger assembly 134, or the alarm switch may be positioned on the tubular portion of the striker 110.

Figure 23:
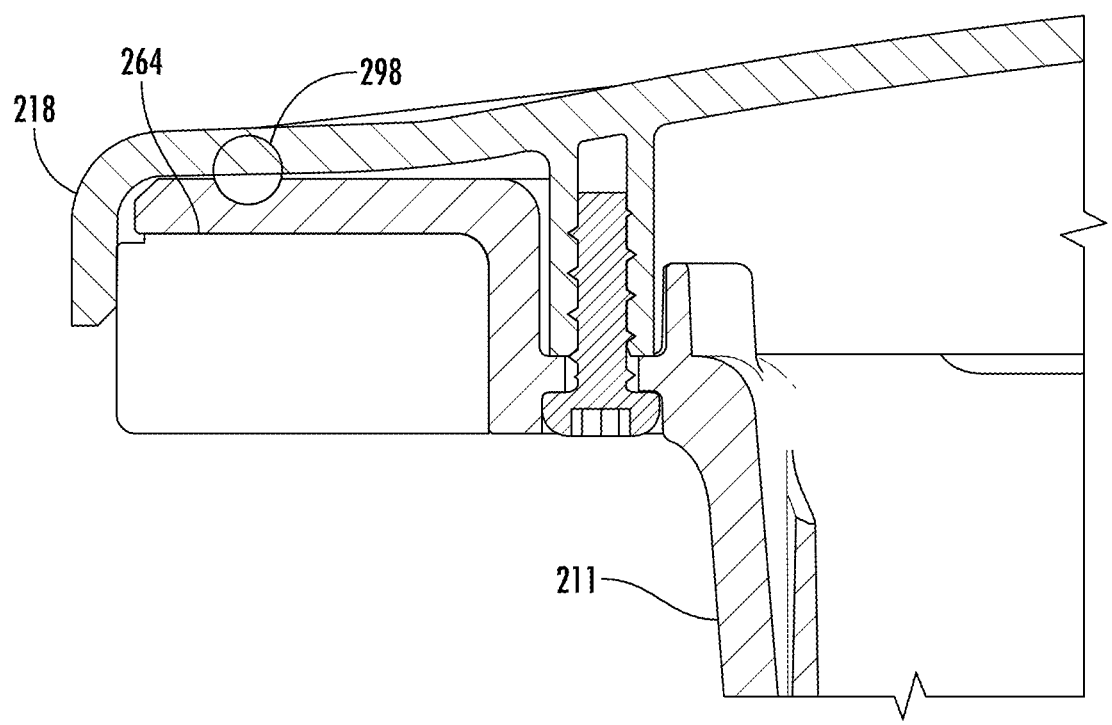
FIG. 23 is an enlarged view of the lid edge shown on the left-hand side in FIG. 6B in accordance with a second embodiment of the present invention.

FIG. 23 illustrates an enlarged view of the lid edge shown on the left-hand side in FIG. 6B. The inner lid 211 and the outer lid 218 may be sealed together using fasteners such as screws. A sealant 298 or a caulk like rope may be provided between the inner lid 211 and the outer lid 218. A sealant 298 or a caulk like rope may assist in securing the two portions of the lid assembly together and may assist in providing an effective seal. An adhesive backed lid seal 264 may also be provided to assist with sealing.

The hatch 100 preferably has an injection molded inner lid 111 and outer lid 118. The hatch 100 may have high strength, overall reduced number of parts, strengthening ribs integrated into inner lid 111 and outer lid 118, and fixed or front hinge 152 molded into inner lid 111.

Figure 24A:
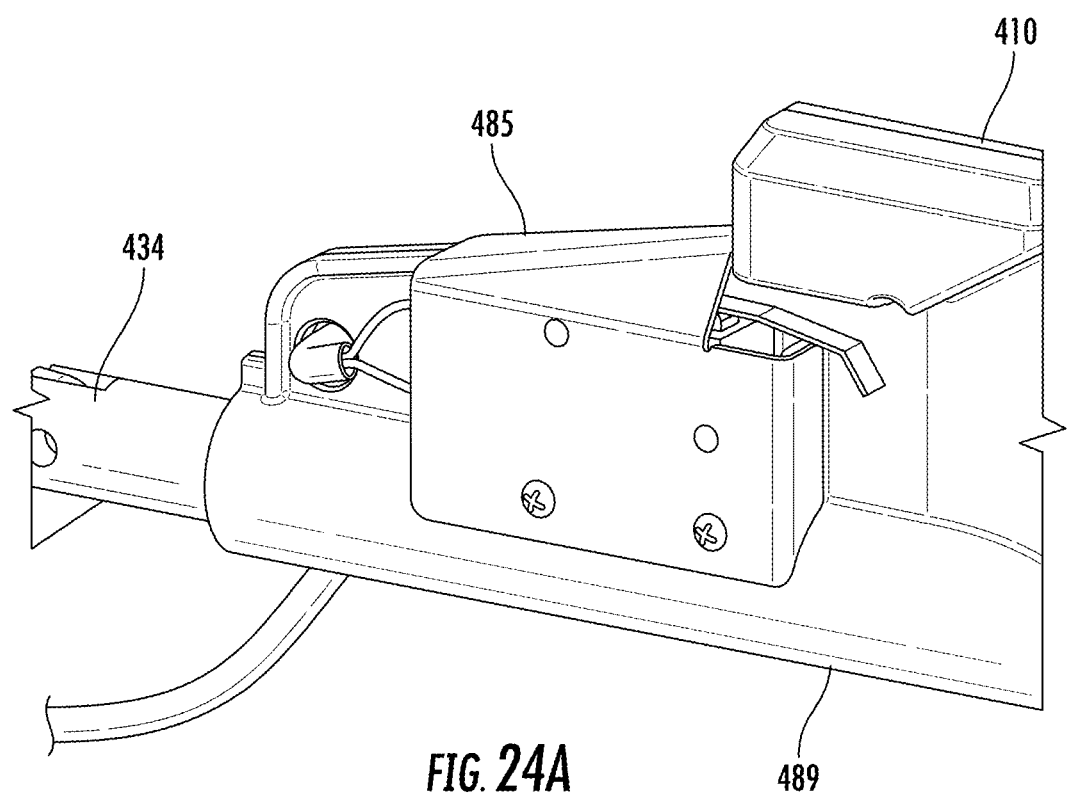
FIG. 24A is a perspective, inside view of an alarm switch mounted on a cover in accordance with a fourth embodiment of the present invention.
Figure 24B:
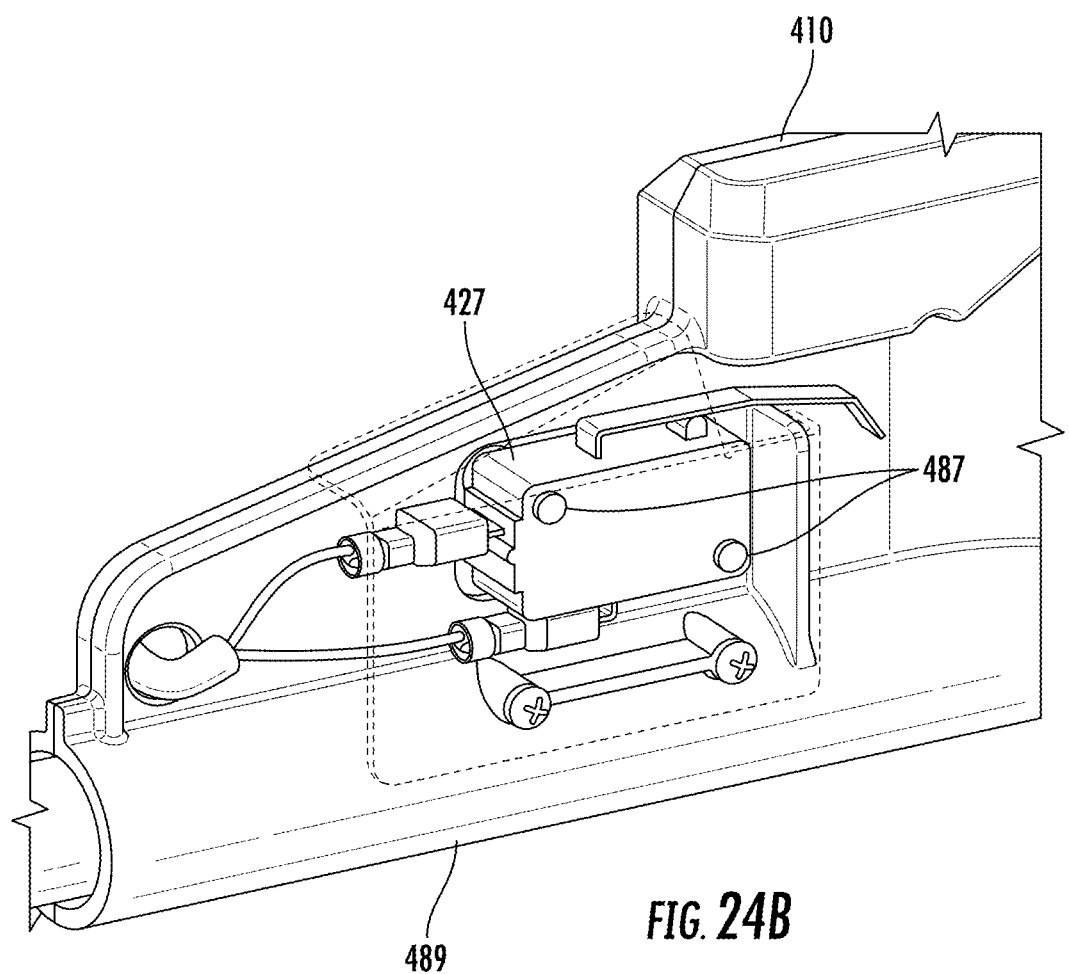
FIG. 24B is a perspective, inside view of the alarm switch of FIG. 24A where the cover is transparent.
Figure 24C:
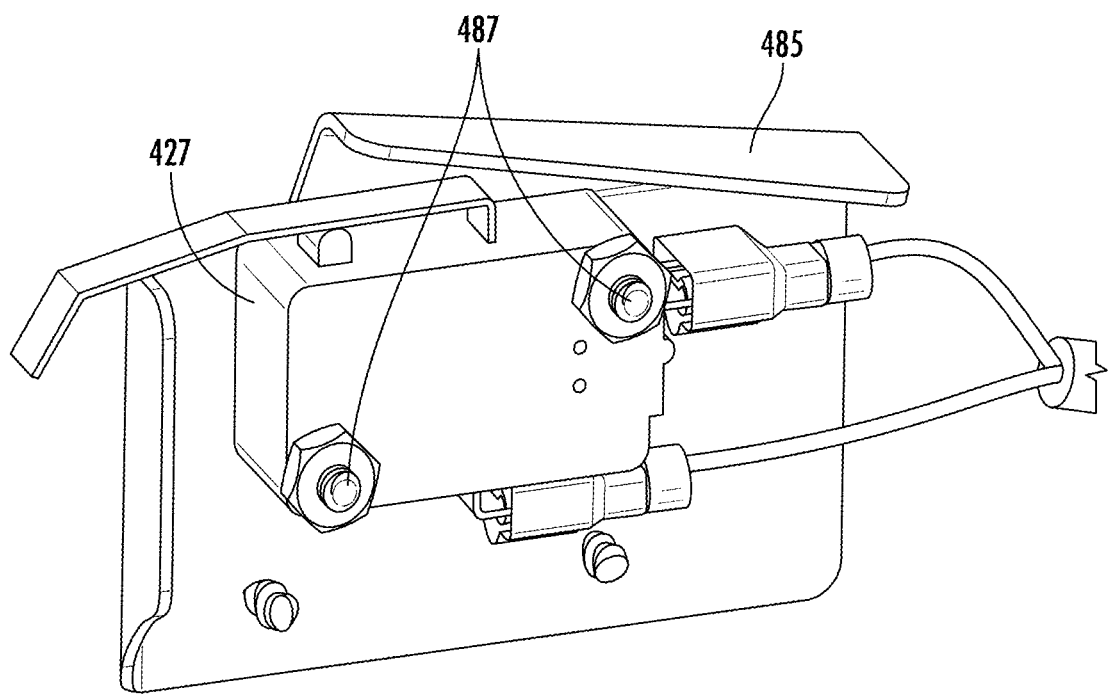
FIG. 24C is a perspective, outside view of the alarm switch of FIG. 24A where the striker is hidden.
Figure 24D:
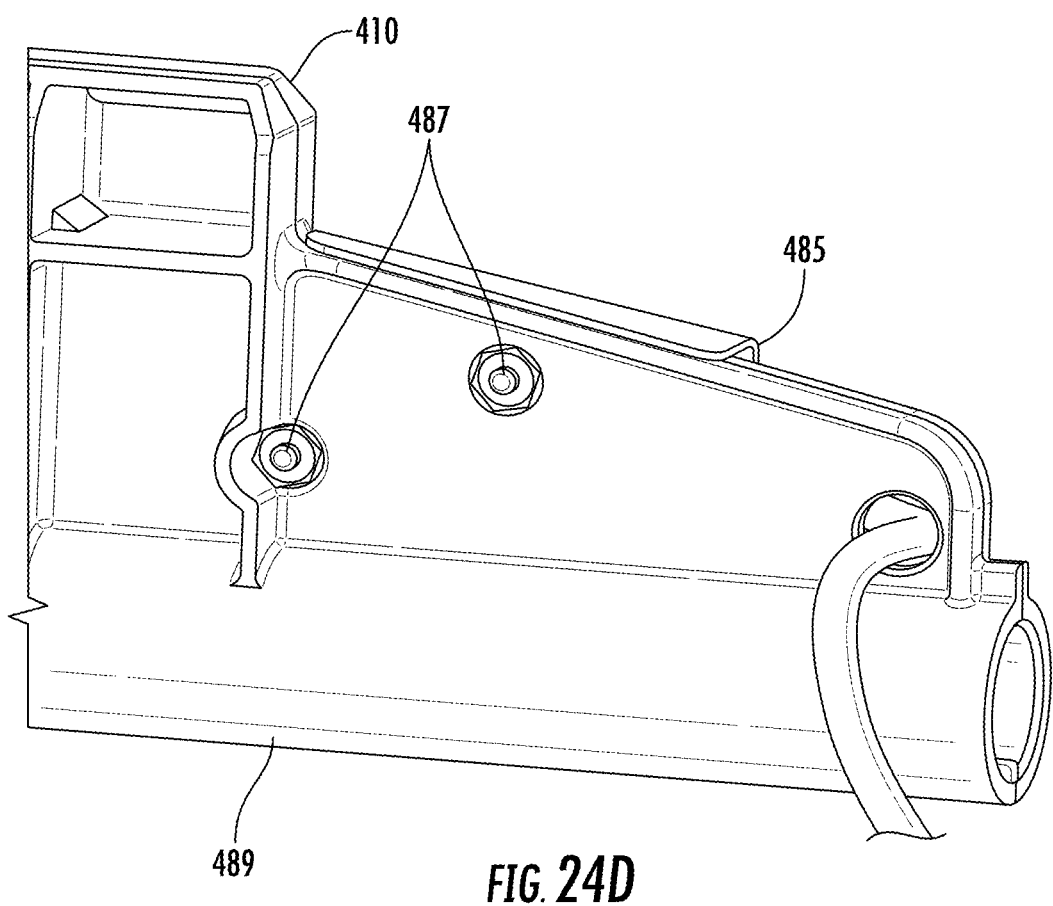
FIG. 24D is a perspective, outside view of the alarm switch of FIG. 24A where the striker is shown.
Figure 24E:
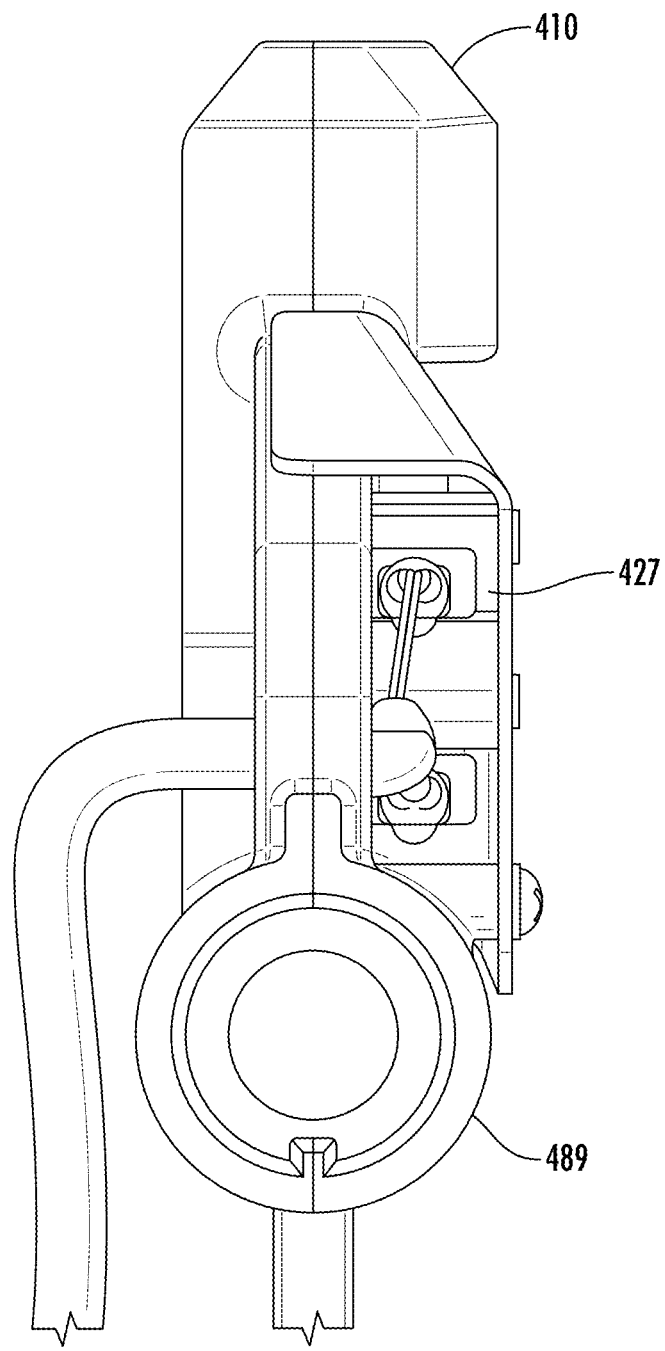
FIG. 24E is a side view of the alarm switch of FIG. 24A.

As stated above, the alarm switch 127, 227, 327, 427 may be installed in various alternative positions. FIG. 24A-24E illustrate various views of an alarm switch 427 is mounted on a cover 485. The striker 410 may comprise a tubular portion 489, and this tubular portion 489 may define a recess in which the link and plunger assembly 434 may be received. As shown in FIG. 24A, a cover 485 may be secured to a tubular portion 489 of striker 410. This is done via screws in the illustrated embodiments of FIG. 24A-24E, but other approaches for securing the cover 485 may be used as well. The cover 485 may extend upwardly from the tubular portion 489 without contacting the remainder of the striker 410. Two studs 487 may extend from the cover so that the alarm switch 427 may be secured to the cover 485. These studs 487 may be configured so that they do not come into contact with the striker 410. Studs 487 may comprise threads so that the alarm switch 427 may be secured in position.

By securing the alarm switch as illustrated in FIGS. 24A-24E, the alarm switch 427 may be configured to come into contact with the rotating locker 105 (see FIG. 20B) whenever the latch is closed and the rotating locker 105 is rotated to a fully latched position. The alarm switch 427 may also be positioned in other locations in other embodiments. For example, the alarm switch 427 may be positioned on a lid assembly or on the link and plunger assembly 434. Multiple alarm switches may be used in some embodiments.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A vehicle hatch comprising:
a clamping system having a trim ring,
a frame assembly having a frame, the frame and the trim ring being fastened together with a sealant applied to an underside of the frame, and the frame and the trim ring being fastened together around a perimeter of the frame with screws installed from inside of a vehicle so that the vehicle hatch is configured to be secured to a vehicle roof; and
a lid assembly comprising a latch, the latch being configured to move between a first position and a second position, wherein the lid assembly comprises an inner lid and an outside lid; and
wherein the inner lid and the outside lid comprise a snap configuration configured to assist in securing the inner lid and the outside lid together.

2. The vehicle hatch of claim 1, wherein the inner lid comprises a male portion of the snap configuration and the outside lid comprises a female portion of the snap configuration.

3. The vehicle hatch of claim 1, wherein the outside lid comprises a male portion of the snap configuration and the inner lid comprises a female portion of the snap configuration.

4. A vehicle hatch comprising:
a clamping system having a trim ring,
a frame assembly having a frame, the frame and the trim ring being fastened together with a sealant applied to an underside of the frame, and the frame and the trim ring being fastened together around a perimeter of the frame with screws installed from inside of a vehicle so that the vehicle hatch is configured to be secured to a vehicle roof;
a lid assembly comprising a latch, the latch being configured to move between a first position and a second position;
at least one link and plunger assembly, the at least one link and plunger assembly comprising a link and a plunger, the at least one link and plunger assembly comprising a first side and a second side, the first side being fixed relative to the frame and the second side being connected to a contact surface, wherein the at least one link and plunger assembly comprises a fulcrum about which the link and plunger are capable of rotating with respect to each other, wherein the latch is configured to contact the contact surface when the latch is in the first position, securing the lid assembly to the frame assembly, and wherein the latch is configured so that it does not contact the link and plunger assembly when the latch is the second position, allowing the lid assembly to be opened.

5. The vehicle hatch of claim 4, wherein the lid assembly comprises a front hinge that is molded into the lid assembly.

6. The vehicle hatch according to claim 4, wherein the link and plunger assembly is connected to the vehicle hatch, the link and plunger assembly being configured to allow the vehicle hatch to move between the closed position and the vented position.

7. The vehicle hatch according to claim 4, wherein the link and plunger assembly is configured to restrain the movement of the vehicle hatch when the vehicle hatch is in the vented position.

8. A vehicle hatch comprising:
a clamping system having a trim ring,
a frame assembly having a frame, the frame and the trim ring being fastened together with a sealant applied to an underside of the frame, and the frame and the trim ring being fastened together around a perimeter of the frame with screws installed from inside of a vehicle so that the vehicle hatch is configured to be secured to a vehicle roof; and
a lid assembly comprising a latch, the latch being configured to move between a first position and a second position, wherein the lid assembly comprises an inner lid and an outside lid; and
a handle molded into a corner of the inner lid.

9. The vehicle hatch according to claim 8, wherein the lid assembly is configured to shift between an unvented position and a vented position, wherein, in the unvented position, the lid assembly rests on the frame and where, in the vented position, the lid assembly is elevated above the frame.

10. The vehicle hatch according to claim 8, wherein, in a vented position, the vehicle hatch is elevated at least two inches from the frame.

11. The vehicle hatch according to claim 8, wherein the trim ring comprises one or more trim ring recesses wherein the frame comprises one or more frame recesses, wherein the trim ring and the frame are configured to be secured together by fasteners received within the one or more trim ring recesses and the one or more frame recesses.

12. The vehicle hatch according to claim 8 further comprising at least one alarm switch.

13. The vehicle hatch according to claim 12, wherein the at least one alarm switch is configured to detect when a latch is in a first position and wherein the at least one alarm switch is configured to detect when a lid assembly is closed.

14. A vehicle hatch comprising:
a clamping system having a trim ring,
a frame assembly having a frame, the frame and the trim ring being fastened together with a sealant applied to an underside of the frame, and the frame and the trim ring being fastened together around a perimeter of the frame with screws installed from inside of a vehicle so that the vehicle hatch is configured to be secured to a vehicle roof;
a lid assembly comprising a latch, the latch being configured to move between a first position and a second position,
wherein a core insert is provided in the lid assembly, and the core insert is provided between an inner lid and an outside lid; and
wherein the core insert comprises foam and is configured to improve the strength of the lid assembly, reduce noise, and improve insulation.

15. A vehicle hatch comprising:
a clamping system having a trim ring,
a frame assembly having a frame, the frame and the trim ring being fastened together with a sealant applied to an underside of the frame, and the frame and the trim ring being fastened together around a perimeter of the frame with screws installed from inside of a vehicle so that the vehicle hatch is configured to be secured to a vehicle roof;
a lid assembly comprising a latch, the latch being configured to move between a first position and a second position, wherein the lid assembly comprises an inner lid and an outside lid; and
wherein the inner lid and the outside lid comprise one or more strengthening ribs.

16. The vehicle hatch of claim 15, wherein the inner lid and the outside lid are both injection molded.

17. The vehicle hatch according to claim 15, wherein the inner lid and the outside lid are configured to be attached together without fixturing.

18. The vehicle hatch according to claim 15, wherein the inner lid and the outside lid are injection molded.

* * * * *